US006535215B1

(12) United States Patent
DeWitt et al.

(10) Patent No.: US 6,535,215 B1
(45) Date of Patent: Mar. 18, 2003

(54) METHOD FOR ANIMATING 3-D COMPUTER GENERATED CHARACTERS

(75) Inventors: Lewis Charles DeWitt, Ormond Beach, FL (US); Tu Thanh Lam, Orlando, FL (US); Daniel Stephen Silverglate, Orlando, FL (US); Edward Mitford Sims, Orlando, FL (US); Carol Jean Wideman, Orlando, FL (US)

(73) Assignee: Vcom3D, Incorporated, Orlando, FL (US)

( * ) Notice: Subject to any disclaimer, the term of this patent is extended or adjusted under 35 U.S.C. 154(b) by 201 days.

(21) Appl. No.: 09/632,955

(22) Filed: Aug. 4, 2000

Related U.S. Application Data
(60) Provisional application No. 60/147,631, filed on Aug. 6, 1999.

(51) Int. Cl.$^7$ ................................................ G06T 15/00
(52) U.S. Cl. ........................................................ 345/473
(58) Field of Search .................................. 345/419, 473, 345/474, 475, 518, 519

(56) References Cited

U.S. PATENT DOCUMENTS

| | | | |
|---|---|---|---|
| 4,600,919 A | 7/1986 | Stern ........................... | 340/725 |
| 5,659,764 A | 8/1997 | Sakiyama et al. ........... | 395/753 |
| 5,877,778 A | 3/1999 | Dow et al. .................... | 345/474 |
| 6,115,053 A | 9/2000 | Perlin .......................... | 345/473 |

OTHER PUBLICATIONS

Bernie Roehl, H anim Humanoid Animation Working Group, Specification for a Standard Humanoid Version 1.1 Upgrade Aug. 3, 1999.

Ikan Inverse Kinematics using A Nalytical Methods, last modified Mar. 22, 2000 web site http://hms.upenn.edu/sofeware/ik/ik.html.

Deepak Tolani, Ambarish Goswami, Norman I. Badler, Real–time kinematics techniques for anthropomorphic limbs, University of Pennsylvania, Computer and Information Science Department, Philadelphia, PA, 1998.

Norman I. Badler, Cary B. Phillips, Bonnie L. Webber, Simulating Humans: Computer Graphics, Animation, and Control, Oxford University Press, Mar. 25, 1999.

*Primary Examiner*—Phu K. Nguyen
(74) *Attorney, Agent, or Firm*—Beusse, Brownlee, Bowoon & Wolter, P.A.; David G. Maire

(57) ABSTRACT

A character animation system translates high-level commands from an external application into motions and deformations of a character model. The character animations are (1) composed in real-time from a sequence of basic actions and expressions, (2) calculated based on the desired end position and orientation of a hand or other body part, or (3) are generated randomly to simulate natural fidgets of the human body. In each case, the character animation system assures (1) that each action blends naturally with the succeeding action, (2) that collisions between body parts are avoided, and (3) that facial expressions are coordinated in parallel with the actions.

25 Claims, 28 Drawing Sheets

FIG. 7

701 Command Table

| Command Syntax | Description | Explanations |
|---|---|---|
| m<value> | rate multiplier | Increases the rate of transitions, actions, expressions, and holds by dividing the associated time value by the multiplier value. |
| t<value> | transition time | Time to transition from one action to the next action. |
| h<value> | hold time | Time that the last frame of an action is held. |
| tp<x>,<y>,<z> | trackpoint position | Position in global x,y,z coordinates. |
| <tracker_joint> > <target> | tracking | Causes z-axis of selected tracker_joint to orient toward selected target. Target may be trackpoint position tp, another joint, or the user viewpoint. |
| `<expression> | facial expression animation or pose | Commands starting with a back quote "`" are interpreted as facial expressions. |
| <action> | joint animation or pose | Commands starting with an alpha character, and not immediately followed by a numerical character or bracket "[" are interpreted as actions. |
| <joint_name> [<x>,<y>,<z>,<α>] | joint override | Library joint angle for following action are overridden by commanded joint values. |

FIG. 8

Action Library Data (per Action) 801

| joint | Frame 0 | Frame 1 | Frame 2 | | Frame $N_A$ |
|---|---|---|---|---|---|
| sacroiliac | x,y,z,α | x,y,z,α | x,y,z,α | ... | x,y,z,α |
| r_hip | x,y,z,α | x,y,z,α | x,y,z,α | ... | x,y,z,α |
| r_knee | x,y,z,α | x,y,z,α | x,y,z,α | ... | x,y,z,α |
| r_ankle | x,y,z,α | x,y,z,α | x,y,z,α | ... | x,y,z,α |
| r_hip | x,y,z,α | x,y,z,α | x,y,z,α | ... | x,y,z,α |
| r_knee | x,y,z,α | x,y,z,α | x,y,z,α | ... | x,y,z,α |
| r_ankle | x,y,z,α | x,y,z,α | x,y,z,α | ... | x,y,z,α |
| neck | x,y,z,α | x,y,z,α | x,y,z,α | ... | x,y,z,α |
| skullbase | x,y,z,α | x,y,z,α | x,y,z,α | ... | x,y,z,α |
| r_shoulder | x,y,z,α | x,y,z,α | x,y,z,α | ... | x,y,z,α |
| r_elbow | x,y,z,α | x,y,z,α | x,y,z,α | ... | x,y,z,α |
| r_wrist | x,y,z,α | x,y,z,α | x,y,z,α | ... | x,y,z,α |
| l_shoulder | x,y,z,α | x,y,z,α | x,y,z,α | ... | x,y,z,α |
| l_elbow | x,y,z,α | x,y,z,α | x,y,z,α | ... | x,y,z,α |
| l_wrist | x,y,z,α | x,y,z,α | x,y,z,α | ... | x,y,z,α |
| ... | x,y,z,α | x,y,z,α | x,y,z,α | ... | x,y,z,α |

Expression Library Data (per Expression) 802

| vertex | Frame 0 | Frame 1 | Frame 2 | | Frame $N_E$ |
|---|---|---|---|---|---|
| vertex 1 | x,y,z | x,y,z | x,y,z | ... | x,y,z |
| vertex 2 | x,y,z | x,y,z | x,y,z | ... | x,y,z |
| vertex 3 | x,y,z | x,y,z | x,y,z | ... | x,y,z |
| ... | x,y,z | x,y,z | x,y,z | ... | x,y,z |

FIG. 10B
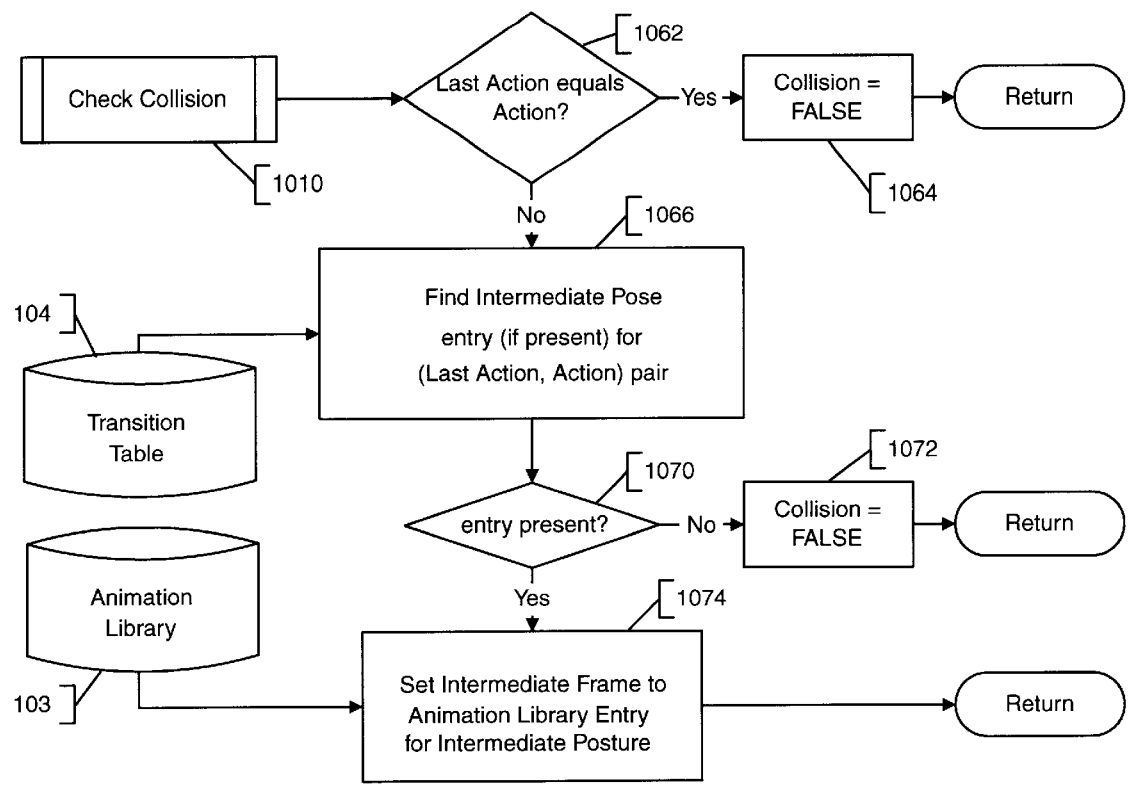
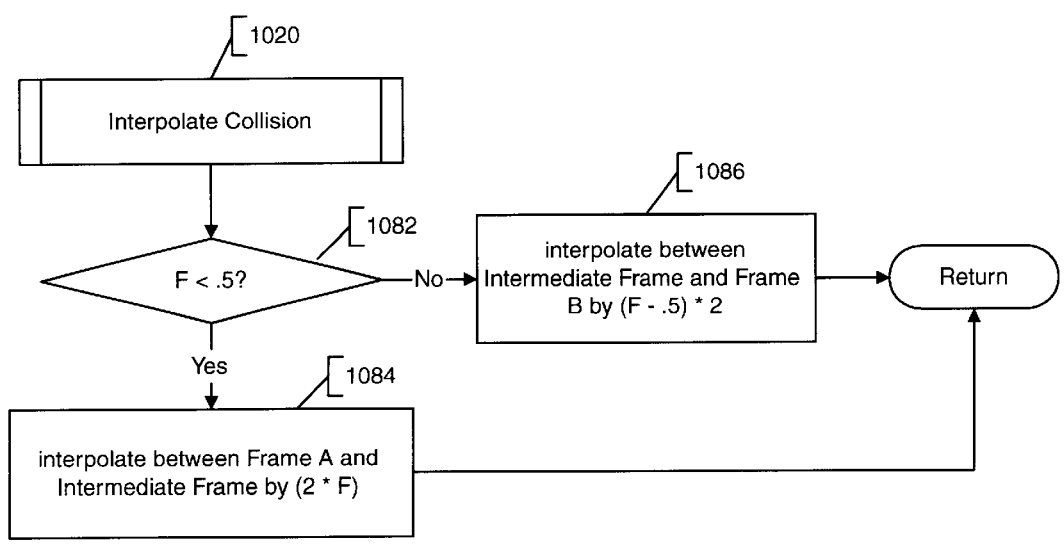

FIG. 21A
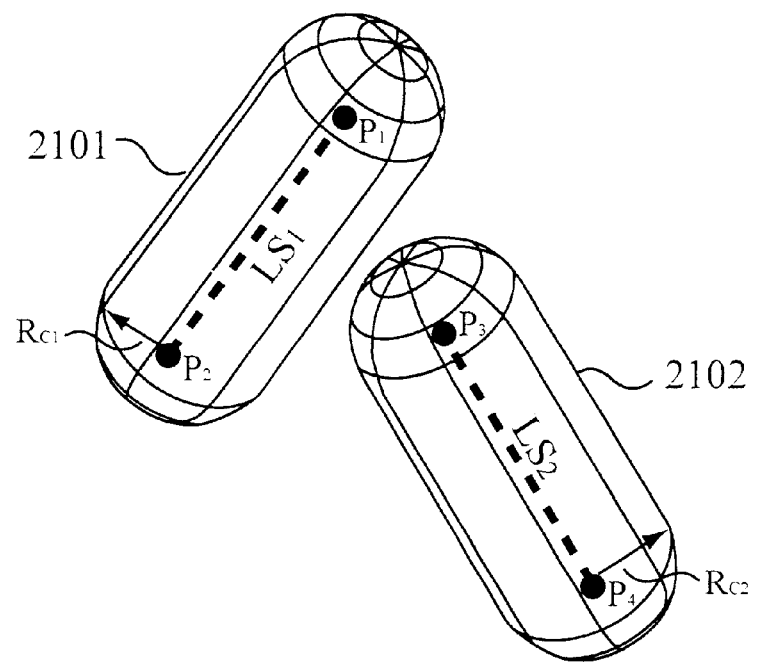
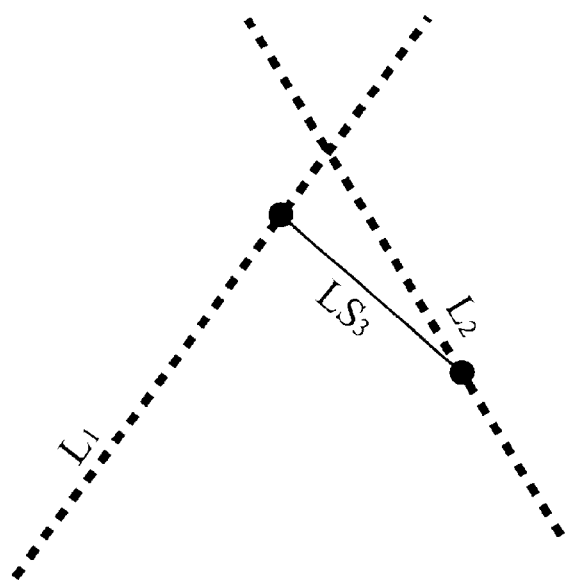

FIG. 21B
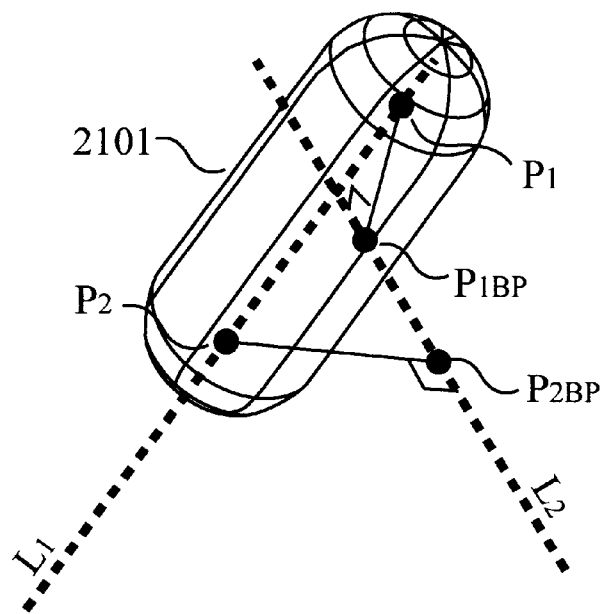
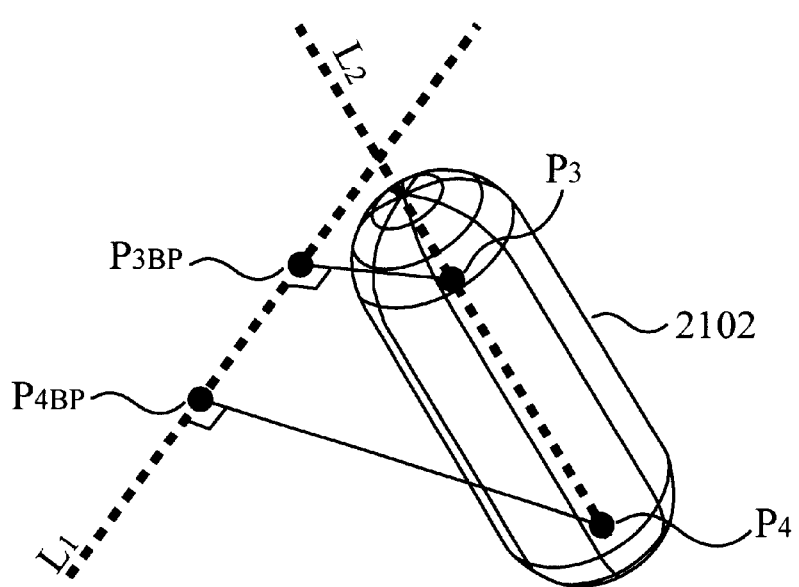

FIG. 23
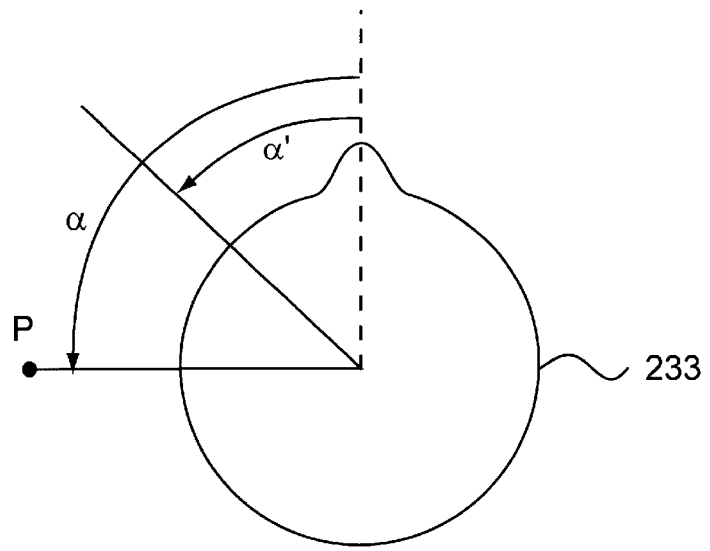
Head (Top View)
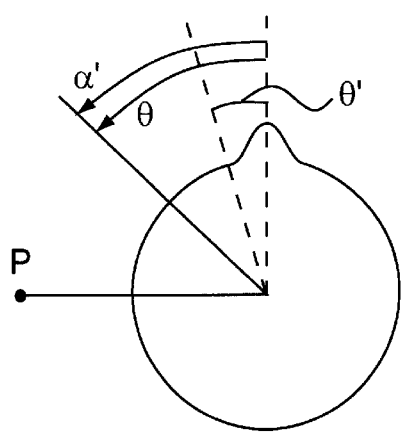
Time = 0
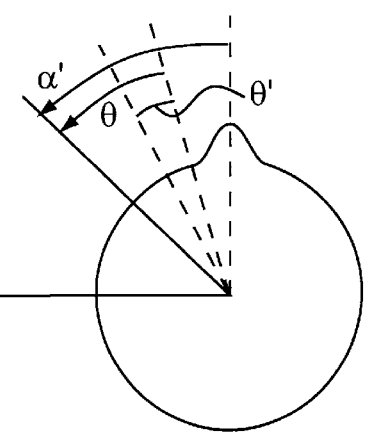
Time = 1

METHOD FOR ANIMATING 3-D COMPUTER GENERATED CHARACTERS

This application claims the benefit of U.S. Provisional Application 60/147,631 filed Aug. 6, 1999.

FIELD OF THE INVENTION

The present invention relates to the simulation and visual representation of interactive 3-D characters by digital computers.

BACKGROUND OF THE INVENTION

A new generation of personal computers (PCs) and set-top boxes is now coming onto the market. These are capable of computing real-time 3D graphics such as character animation. However, interfaces for controlling these animated characters typically only allow only the sequential playback of stored animations, or for "puppeteering" (direct user manipulation) through joystick, mouse, and other user interface devices. In real-world experience, human (and even animal) characters respond to language-based commands and questions, exhibit visible manifestations of mental and emotional state, direct attention to appropriate objects and events, and respond with voice, gesture, body language, and demonstration. This "animation from natural language" is necessary to provide natural user interfaces to characters that appear to have higher-order intelligence.

In order to fully address the novelty and advantages of the present invention, it is helpful to first survey the current art of both the computer modeling and the computer animation of characters. In this context, modeling refers to the creating the geometry and appearance of the character. Animation refers to the methods of controlling the motion of the computer-generated character, and synchronizing this motion with sound and other elements of the simulated environment.

The most common method for modeling 3-D characters intended for real-time computer animation is described by the Specification for a Standard Humanoid (version 1.1) of the Web3D Consortium's Humanoid Animation Working Group. As described in that document:

"The human body consists of a number of segments (such as the forearm, hand and foot) which are connected to each other by joints (such as the elbow, wrist and ankle). In order for an application to animate a humanoid, it needs to obtain access to the joints and alter the joint angles. The application may also need to retrieve information about such things as joint limits and segment masses.

"Each segment of the body will typically be defined by a mesh of polygons, and an application may need to alter the locations of the vertices in that mesh. The application may also need to obtain information about which vertices should be treated as a group for the purpose of deformation.

"A VRML Humanoid file contains a set of Joint nodes that are arranged to form a hierarchy. Each Joint node can contain other Joint nodes, and may also contain a Segment node which describes the body part associated with that joint."

The most common method for computer animation of 3-D characters is exemplified by Stern in U.S. Pat. No. 4,600,919, titled Three Dimensional Animation. In this method, the motion of the limbs of a character are represented by a series of key frames, with each key frame defining the position and orientation of each segment of the character's body. A computer system then generates a series of in-between frames by interpolating the position and orientation of each vector for each displayed video frame. This approach has the limitation that, unless the original key frames are properly selected, one body part may collide with, or intersect with, another body part as the trajectories of the body segment vectors are interpolated from one in-between frame to the next.

Other developers in the field of real-time character animation have identified methods for sequencing, overlapping, and blending basic animations, wherein each of the component animations can be defined by key frames. Dow et al. (ref. U.S. Pat. No. 5,877,778), for example, teach a method for smoothing from one animation to a following animation. However, again, this method does not include a means for resolving body segment collisions. Nor does it include a means for translating a series of natural language commands into a natural motion representation. Koga et al. (1994) have developed a method for simulating the motion of the arm when grasping and moving objects. However, this method does not identify and avoid potential collisions of the arm with the torso. Nor does it include a method for simulating finger motion.

Badler (1999) has developed a Parallel Transition Network (Pat-Net) approach to animating multiple, potentially parallel actions from natural language. However, each Pat-Net implementation must be individually programmed, and there is no automated methodology for body part collision avoidance.

BRIEF SUMMARY OF THE INVENTION

Accordingly, several objects and advantages of the present invention are:

(a) To simplify the process of character animation, such that complex and realistic, interactive animations may be developed and commanded in a high-level language by individuals not trained in the art of animation.

(b) To provide a method using very low computational requirements for identifying and avoiding impending intersections of body part trajectories.

(c) To reduce data bandwidth requirements, relative to existing animation techniques, by pre-storing key-framed and algorithmically defined animations that may be composited into complex animation in real time.

(d) To provide a method for simulating autonomous behaviors, including blinking, direction of gaze, and fidgeting.

This invention is a method and a system to automatically create complex, compound character animations from stored and/or synthesized basic action animations. Each compound animation is defined by command sequences that command actions to be performed in sequence or in parallel. These actions may include facial expression, orientation of gaze, and speech with lip-synching, as well as body movement. This invention provides methods and systems to automatically arbitrate, sequence, and synchronize various commanded actions, while identifying and avoiding actions and transitions between actions that are physically impossible or improbable, such as body part interferences, unachievable rates of motion, and unnatural stretching or separation of the skin. In this manner, the invention enables the real-time simulation on low-cost client computers, of complex and realistic character actions that are controlled by simple high-level commands that are received at low bandwidth over a network, or are computed locally. The invention includes methods and systems for defining transition behavior based on easily edited data tables. It is also highly optimized for real-time performance. Specific applications of this invention include: 1) supplementing character vocal communication with appropriate gesturing and demonstration, 2) real-time translation of spoken or written language to sign language, and 3) interactive educational and entertainment software in which a character responds intelligently to user actions.

BRIEF DESCRIPTION OF THE DRAWINGS

FIG. 7 illustrates a set of control commands that may be processed by the character animation system.

FIG. 8 illustrates a data structure for an animation library.

FIGS. 10a and 10b are flow diagrams illustrating an animation engine cycle.

FIGS. 21a and 21b illustrate graphical structures for determining arm collisions with a torso.

FIG. 23 is a diagram for explaining a process for simulating natural head motion.

DESCRIPTION OF THE PREFERRED EMBODIMENT

An embodiment of the present invention will be described referring to the accompanying figures.

Figure 1:
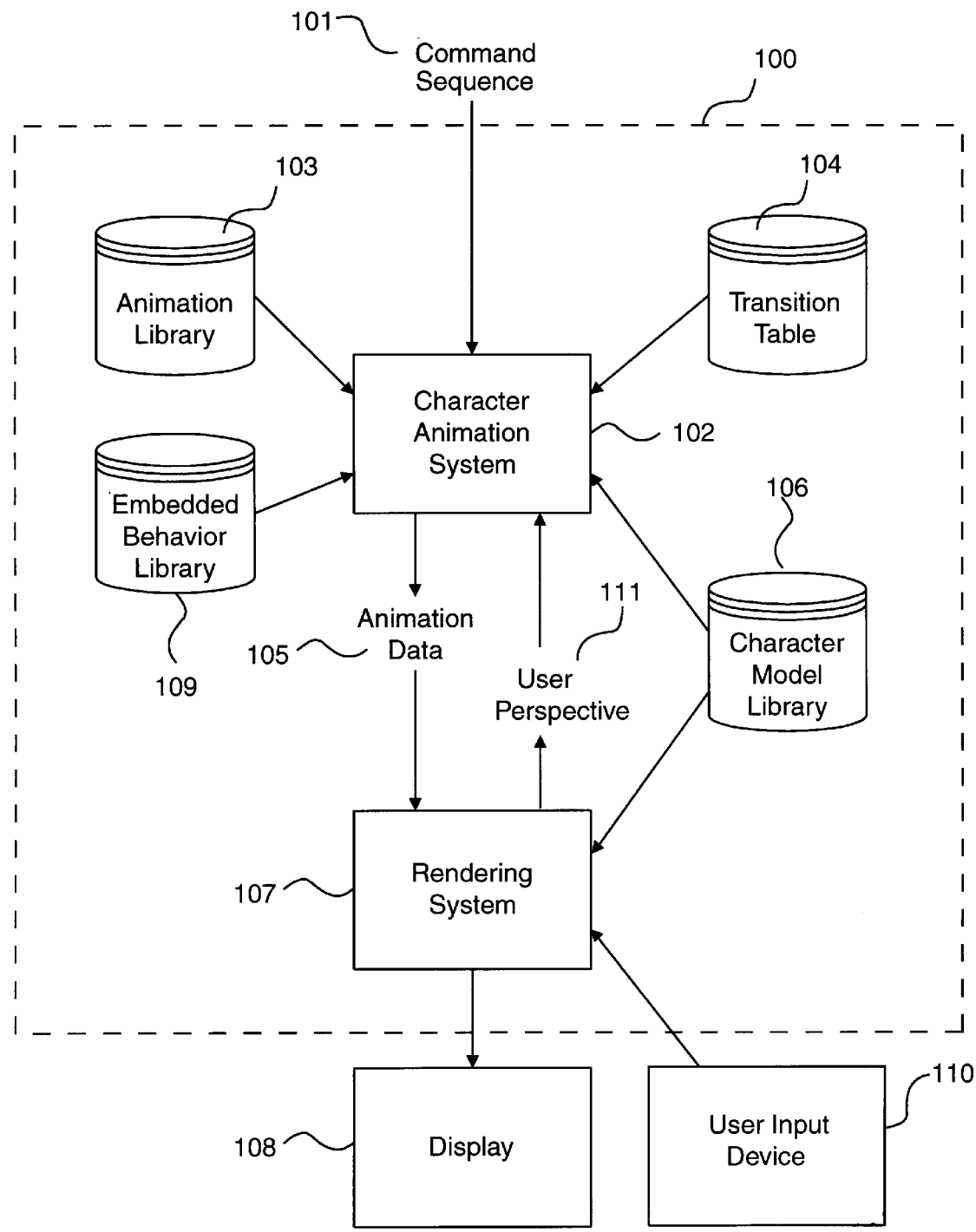
FIG. 1 is a block diagram showing a character animation system.

Referring to FIG. 1, there is shown a block diagram of a Character Animation and Display System 100 in accordance with an embodiment of the invention and which can be used to practice the methods of the invention. A Command Sequence 101 provides a list of one or more commands to be performed in sequence by a Character Animation System 102. The Character Animation System 102 retrieves a description of each action from an Animation Library 103. The Character Animation System 102 then animates the action defined by the first command of the Command Sequence 101 by sending a sequence of angle and position data, called the Animation Data 105, to a Rendering System 107. At the completion of the first action, the Character Animation System 102 retrieves the second action to be animated from the Animation Library 103 and retrieves information from a Transition Table 104 to determine whether the motion from the last state of the first action to the first state of the second action can be performed as an interpolation without one body segment penetrating another body segment and without exceeding any joint angle limitations. If the transition between actions can be achieved without body segment penetrations and without exceeding joint limitations, then a sequence of joint angles defining that interpolation is provided to the Rendering System 107. If the transition cannot be properly performed as an interpolation, then the Transition Table 104 indicates an alternate path to be taken. The Character Animation System 102 then provides a sequence of joint angles defining that alternate path to the Rendering System 107. If at any time there are no commands in Command Sequence 101 to be executed, the Character Animation System 102 generates commands and enters them into the Command Sequence 101. These commands are computed in such a manner that the character appears to fidget, to redirect its attention, and to perform other actions that are typical of a real character waiting for instructions. These commands may be selected at random from the Embedded Behavior Library 109, or they may be computed by the Character Animation System 102 according to methods that will be described in detail in later paragraphs.

Still referring to FIG. 1, the 3-D Rendering System 107 may be any of the well-known type that generate perspective images for a selected viewpoint from a scene graph, including standard geometrical shapes, together with position and orientation transformations. In the preferred embodiment, a standard VRML (Virtual Reality Modeling Language) scene graph and renderer are used. In order to provide views of the character from differing perspectives, a User Input Device 110 is provided. Using the Input Device, which may be a mouse, keyboard, or other common computer input apparatus, the user may control his or her position and orientation relative to the displayed character. This User Perspective information may optionally be supplied to the Character Animation System 101. The character to be animated is retrieved from a Character Model Library 106. This character is formed by a collection of body segments and joints in a hierarchy, as further detailed in FIG. 2 and FIG. 3. In the preferred embodiment, each character model is represented in the Humanoid Animation Standard of the Web3D Consortium. However, other digital representations that use a hierarchical system of joints and segments may also be used. Display 108 may be any standard computer display device, such as a CRT or LCD monitor.

Figure 2:
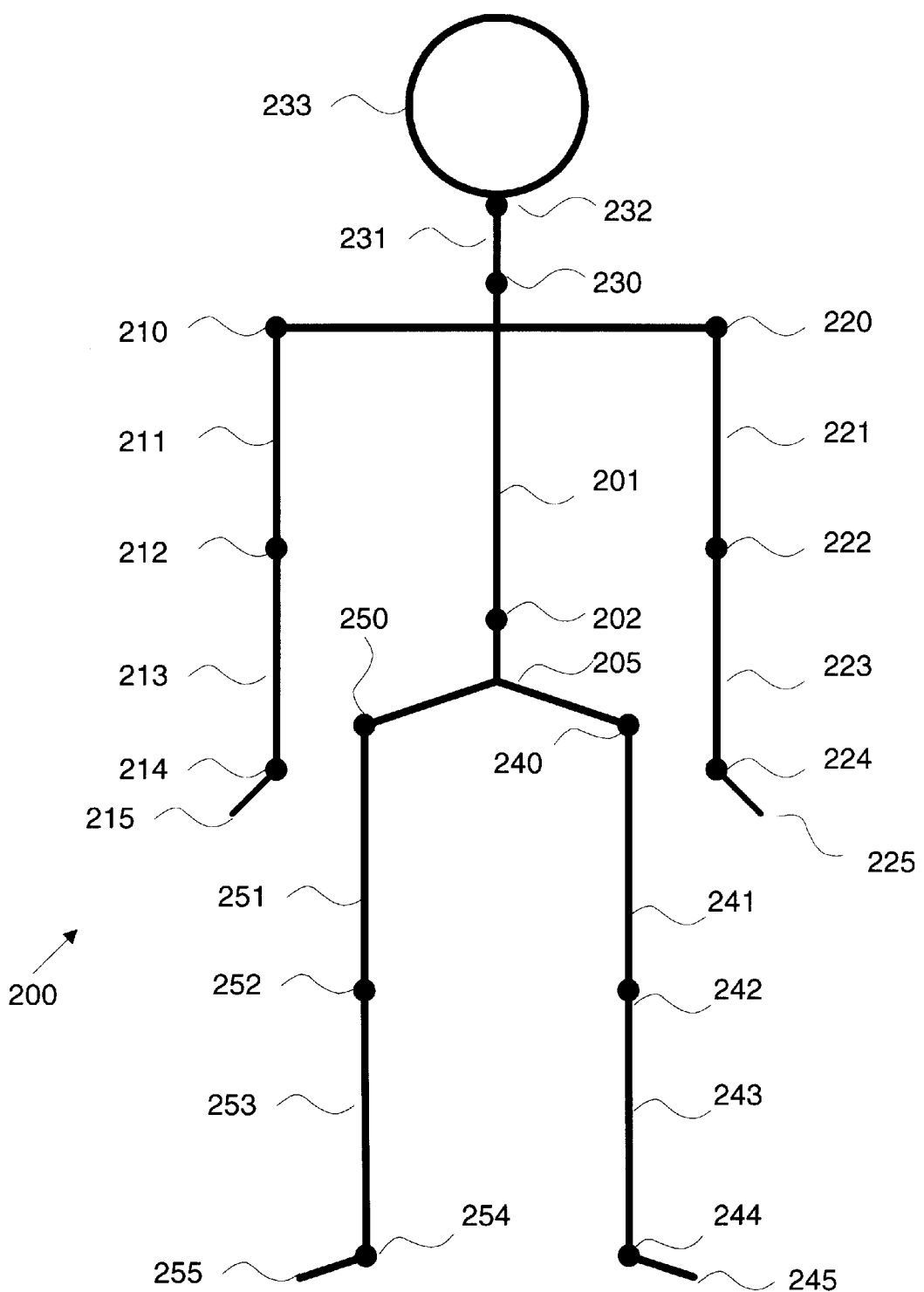
FIG. 2 illustrates a typical segmented character model as may be animated by this invention.

Referring to FIG. 2, there is shown the composition of a typical segmented character of the type to be animated. The figure shows a representative division of the character 200 into segments 201, 205, 211, 213, 215, 221, 223, 225, 231, 233, 241, 243, 245, 251, 253, and 255, attached at joints 202, 210, 212, 214, 220, 222, 224, 230, 232, 240, 242, 244, 250, 252, and 254. In this example, the torso 201 and pelvis 205 are articulated from the sacroiliac 202; the right upper arm 211 is articulated from the right shoulder 210; the right forearm 213 is articulated from the elbow 212; the right hand 215 is articulated from the right wrist 214. In this manner, each of the illustrated body segments is articulated from a parent joint, in turn attached to a parent segment.

Figure 3:
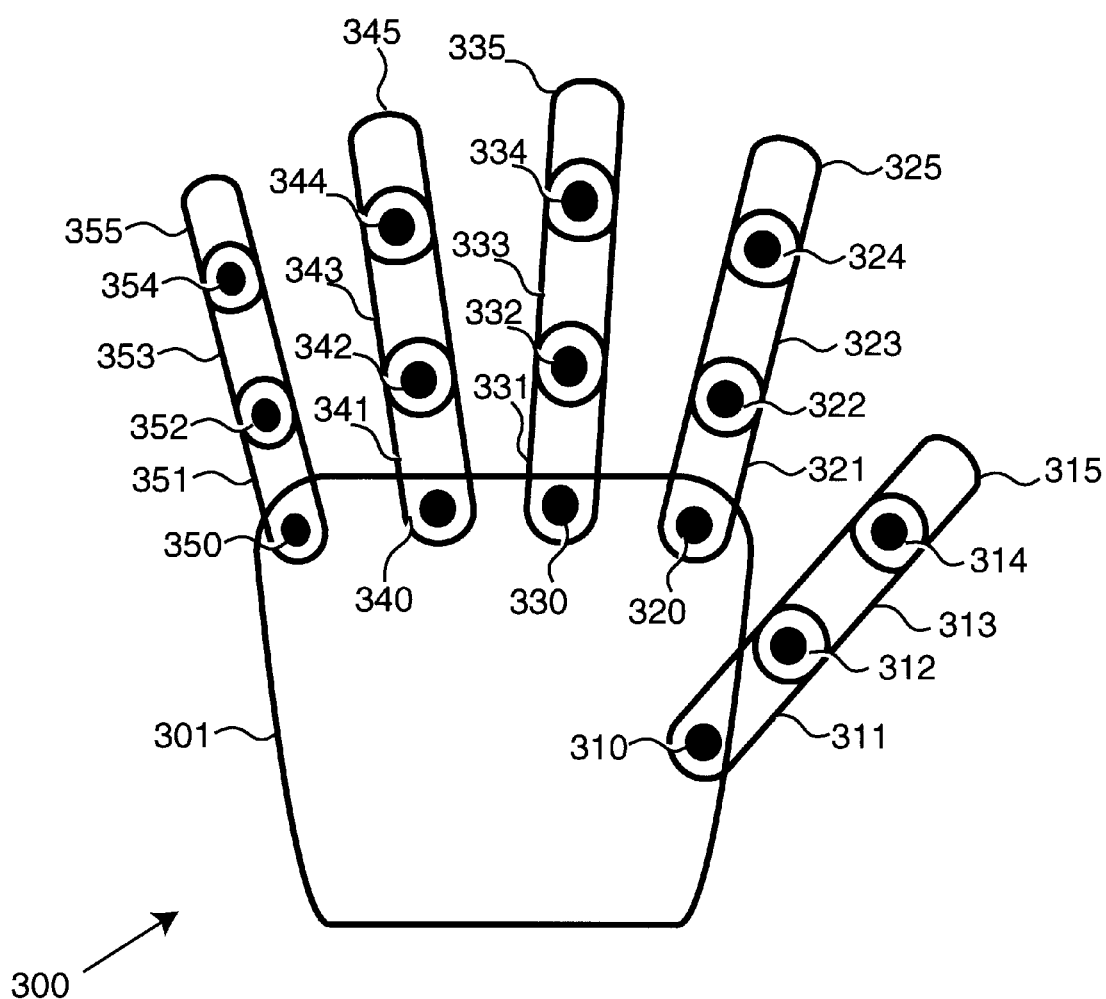
FIG. 3 illustrates a typical segmented hand model as may be animated by this invention.

The segments and joints illustrated in FIG. 2 are typical, but additional segments and their corresponding joints, such as the clavicles and multiple vertebrae of the spine may be added. Of particular significance to this invention is the addition of the hands, as illustrated in FIG. 3. This figure shows a typical, segmented hand model 300 as may be animated by this invention. The hand is modeled as a collection of segments 301, 311, 313, 315, 321, 323, 325, 331, 333, 335, 341, 343, 345, 351, 353, and 355, attached at joints 310, 312, 314, 320, 322, 324, 330, 332, 334, 340, 342, 344, 350, 352, and 354. This hand model 300 replaces each of the hand models 215 and 225, with the exception that the hand model is mirrored in geometry and appearance for the left hand 225, as compared to the illustrated right hand 300. Again, additional segments, such as the metacarpals internal to the palm of the hand may be animated.

Figure 4:
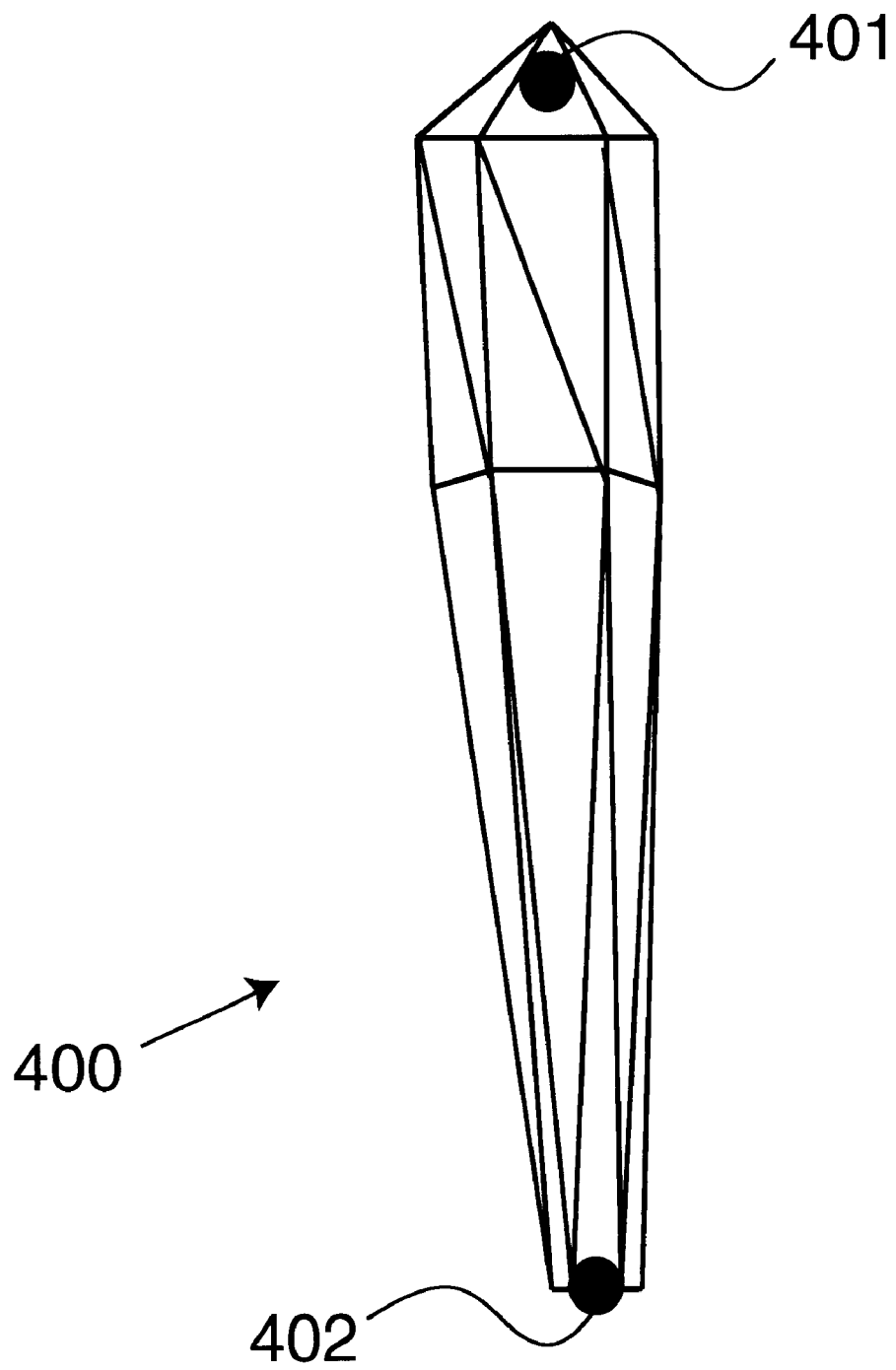
FIG. 4 illustrates a typical polygon mesh representation of the right forearm of the character model.

FIG. 4 illustrates a possible model 400 for one of the body segments, in this case the right forearm 213. The body segment is represented by a collection of polygonal faces, formed by interconnecting a collection of vertices. Any number of polygons and vertices may be used to form the segment model, depending on the desired realism and on the processing capability of the computer. The polygons and vertices of each segment will move together as group, maintaining constant relative position within the segment. The motion of the segment is controlled by implementing a rotation about the parent joint, in this case the elbow joint 401. Each polygon and each vertex of the segment rotates about this same joint, and also moves in concert with the parent joint. In addition, joints from which additional body segments are articulated also move in concert, as part of the same rigid body. In this example, the right hand would be attached to the right wrist joint 402, and would be articulated from that joint.

Figure 5:
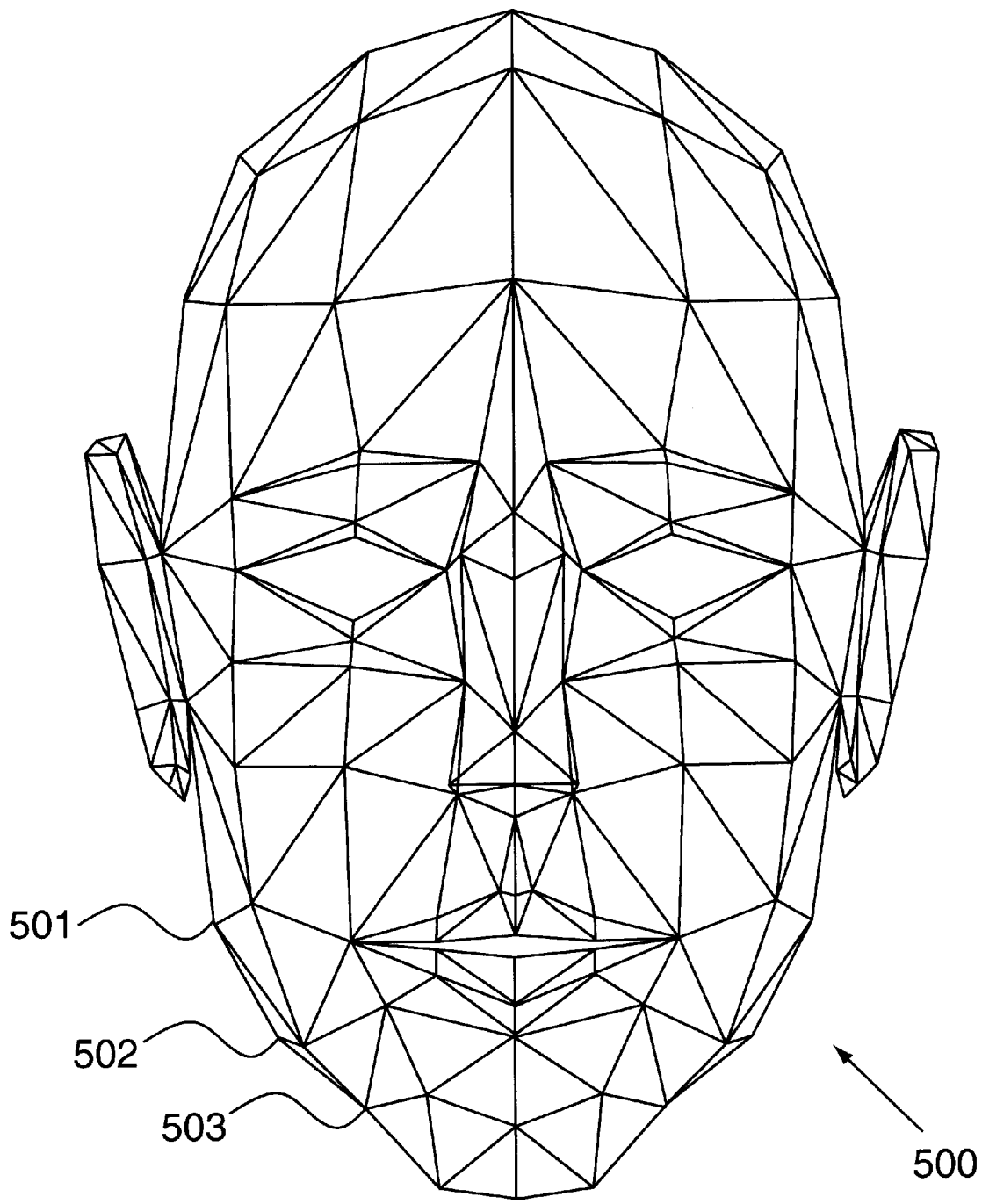
FIG. 5 illustrates a typical deformable mesh model of the face portion of the head segment of the character model.

FIG. 5 illustrates a possible model for the face portion of the head 233 of the character model. The face 500 is modeled in a similar manner to the other body segments, with the exception that the vertices, for example 501, 502, and 503, may be individually animated by moving their location in space (x, y, z) for each displayed frame. Thus, by raising the vertices at the corners of the lips by appropriate amounts, a smiling expression can be formed. Similarly, the vertices of the eyebrows, cheeks, forehead, etc. may be moved to form a variety of expressions. By moving the vertices of the lips, in particular, it is possible to form not only expressions associated with emotion and visual communication, but also to form the facial expressions associated with speaking.

Figure 6:
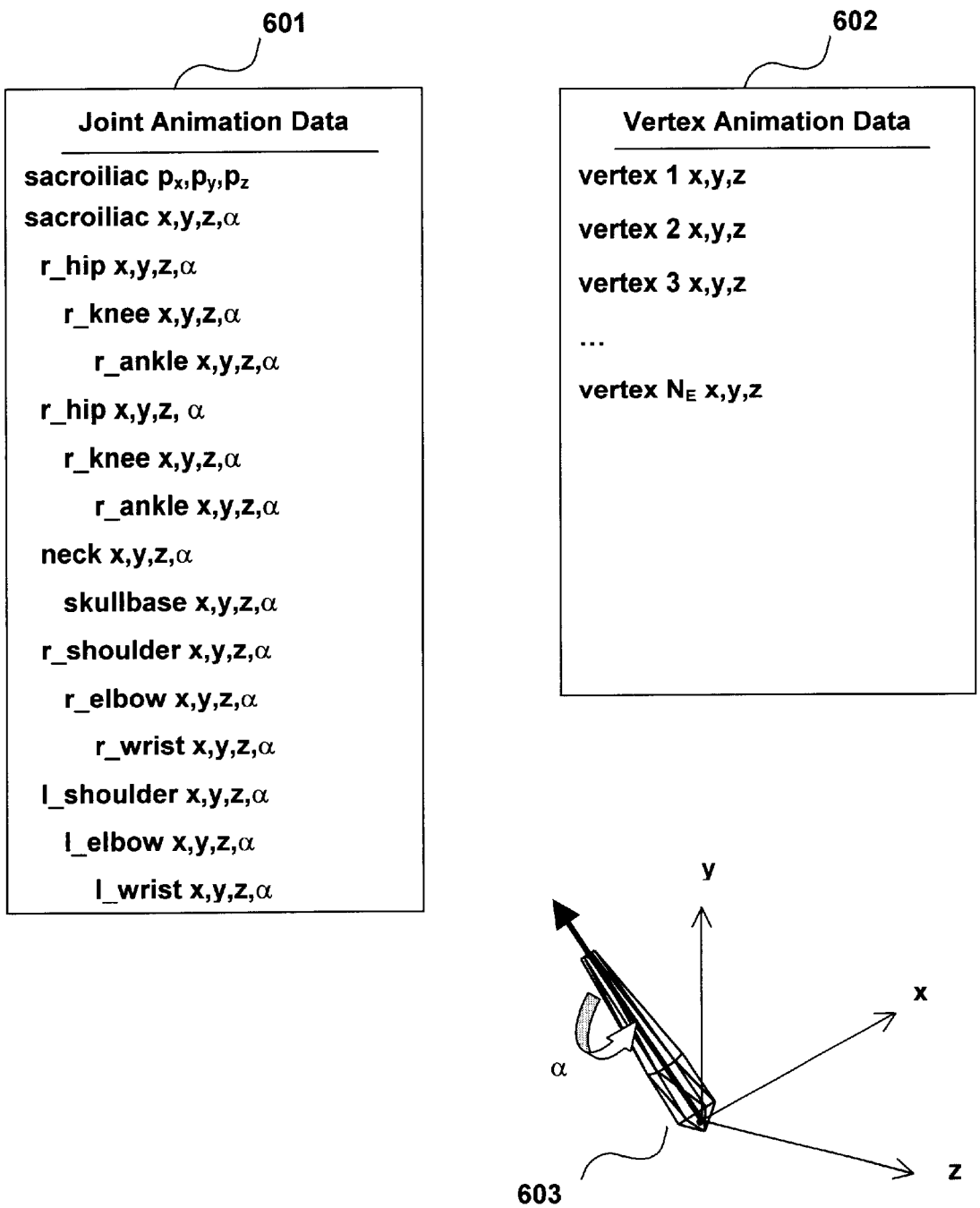
FIG. 6 illustrates details of the animation data generated by the character animation system.

FIG. 6 illustrates the elements of the Animation Data 105 generated by Character Animation System 102 and provided to Rendering Subsystem 107 for each displayed frame. It should be observed that the specific joints included in the Joint Animation Data table 601 may vary for different character models. Also, the number of vertices included in the Vertex Animation Data 602 may vary. Finally, the specific representation of rotations may vary. The preferred method for representing Joint Animation Data rotations is by a unit vector 603 with components x, y, z relative to the parent segment, together with a rotation $\alpha$, expressed in radians, about that vector. Other well-known representations, such as Euler angles, may also be used for this representation. Only one position datum $p_x$, $p_y$, $p_z$ is required for the body location. In this example, the sacroiliac is used as the reference point. Any other location on the body may be used for the body location. The preferred method for representing the location of the face vertices is with components x, y, z relative to the skull base about which the head is rotated.

The Character Animation System 102 receives commands of the form identified in the Command Table 701 in FIG. 7, and accesses Animation Library Data in the form 801 shown in FIG. 8. Using these commands and data, the Character Animation System executes the processes shown in FIG. 9, and detailed in FIG. 10 through FIG. 24, to provide the character Animation Data shown in FIG. 6 to the Rendering System 107. The next several paragraphs describe these processes in increasing detail.

Figure 9:
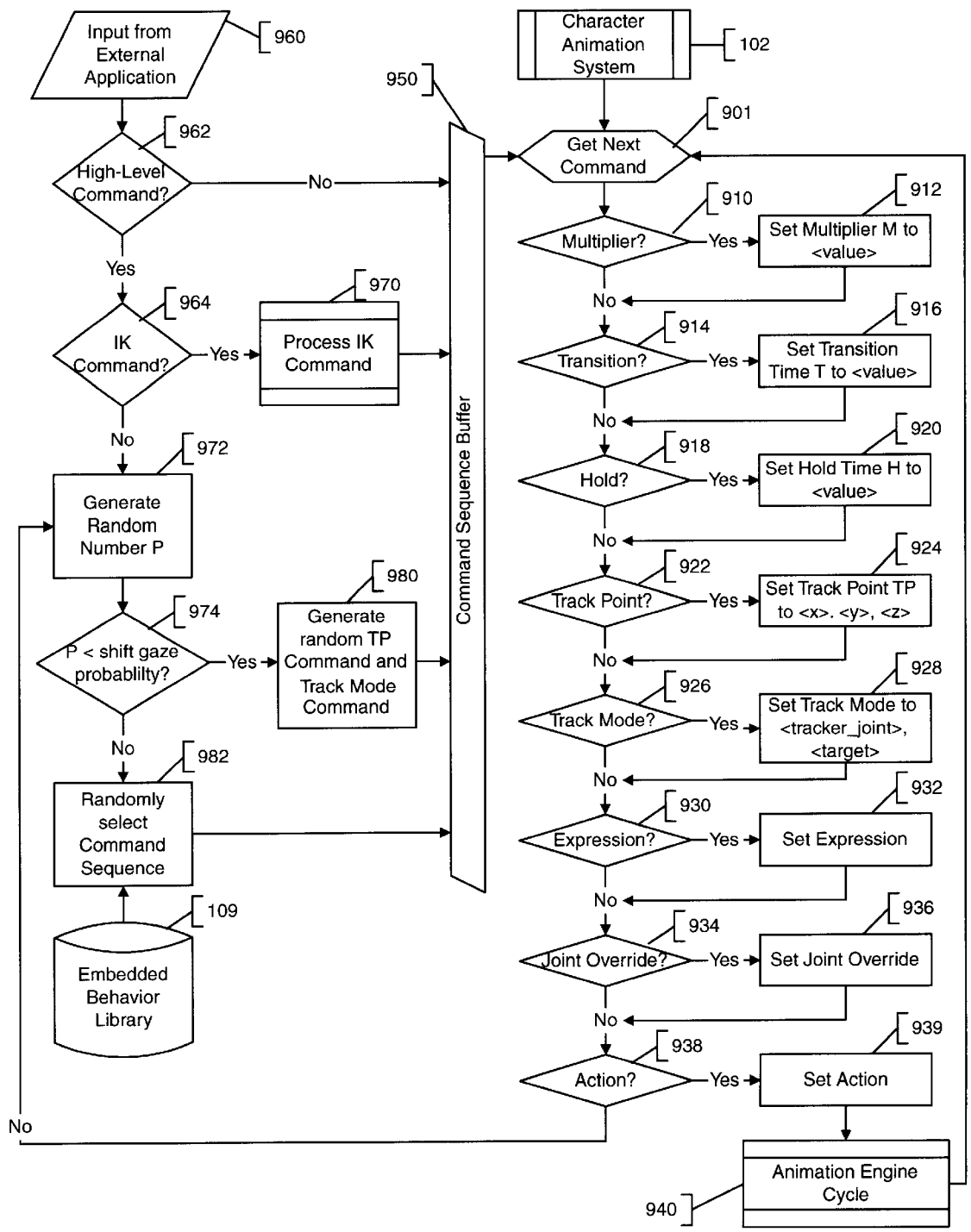
FIG. 9 is a flow diagram illustrating operation of the character animation system.

Referring to FIG. 9, the Character Animation System 102 receives commands in the form shown 701 in FIG. 7. These commands may be stored in fixed media, downloaded, or generated interactively by a real-time application based on User inputs and interaction.

In reviewing the list in FIG. 7 of available commands, it will be seen that there are included commands m, t, and h to control timing of the animation; commands tp and > to control joint animation by tracking; command [ ] to control joints directly; and commands to play back recorded joint animations and facial expressions, where a special symbol ' is used to distinguish facial expressions from joint animations. The significance and application of each of these command types will become apparent in the discussion that follows. Note that the specific notation for these commands is optional, and that different methods for representing the commands may be used.

FIG. 8 illustrates a data structure for a library of basic actions and expressions from which more complex animations may be composed. Referring first to the Action Library Data 801, a set of Frames, also known as key frames, of joint rotation data is stored for each action in the library. For each frame of each action there is stored a rotation for each joint. The preferred representation of this rotation is as a unit vector x, y, z, together with an angle $\alpha$ about that unit vector. A sequence of frames from 0 to $N_A$ is stored for each joint to be animated. These joints typically include those listed, but may include more or less as required for the animation and character of interest. In particular, the joints of the hands, as illustrated in FIG. 3 may be animated in addition to the joints of the body, illustrated in FIG. 2. Also, other representations, such as Euler angles, may be used to represent each rotation. Each frame defines the full configuration of the character body joints for a point in time. Therefore, each action in the library defines the motion of the entire body over a duration of $N_A$ frames. Note that $N_A$ may be zero, in which case the action has no duration, but is only a single pose. The joint configuration at a time in between key frames is defined to be the interpolated value, based on the precise timing relative to the key frames. The preferred method of interpolation is spherical linear interpolation. However, other methods may be used.

There is also shown in FIG. 8 Expression Library Data 802. For each frame of each expression there is stored a position for each vertex of the face. The preferred representation for this position is in Cartesian coordinates x, y, z. Each frame defines the full geometry of the face for a point in time. A sequence of frames from 0 to $N_E$ is stored for each vertex to be animated. Therefore, each expression in the Animation Library defines the motion of the face over a duration of $N_E$ frames. Note that it is most common for an expression to consist of a single pose of the face, in which case $N_E$ is zero.

FIG. 9 illustrates the overall operation of the Character Animation System in the form of a flow diagram. This operation begins with Get Next Command 901 from a Command Sequence Buffer 950. This Command Sequence Buffer 950 stores any number of control commands of the form identified in FIG. 7 in the sequence in which they are received from an External Application 960, a Process IK Command process 970, a Generate Random TP Command and Track TP Command process 980, or a Randomly Selected Command Sequence 982. The details of process 970 and process 980 will be described after first reviewing the operation of blocks 910 through 940 of the figure. As each command is taken from the Command Sequence Buffer, it is evaluated to determine to which of the command types it belongs. If the command is determined by test 910 to be a Multiplier, then a multiplier M is set to the commanded value, according to process 912. If the command is determined by test 914 to be a Transition, then a Transition Time T is set to that commanded value, according to process 916. In a like manner, if the command is determined by test 918 to be a hold, then a Hold Time H is set to that commanded value, according to process 920. If the command is determined by test 922 to be a track point, then the three associated values x, y, and z, are set to those commanded values, according to operation 924. If the command is determined by test 926 to be a Track Mode command, then both the Tracker Joint and Target values are set to the commanded values, according to operation 928. If the command is determined by test 930 to be a Set Expression command, then the expression type is set to that commanded expression, as identified in the Animation Library Data of FIG. 8, according to operation 932. If the command is determined by test 934 to be a Joint Override Command, then the Joint Override values are set by process 936 for each of the identified joints, as identified, in the details of the Joint Override command of FIG. 7. Finally, if the command is determined by test 938 to be an Action, then the action type is set to those referenced by that commanded action, as identified in the Animation Library Data of FIG. 8, and an Animation Engine Cycle 940 is initiated. The details of the Animation Engine Cycle will be described in detail in FIG. 10.

It will be seen that at the time that the Animation Engine Cycle 940 is executed, the values stored by processes 912, 916, 920, 924, 928, and 932 will each be those associated with the most recently received commands of each type. Thus, if a new Multiplier command has not been fetched from the Command Sequence Buffer 950 since the most recent Action command was fetched, then the same Multiplier value that was applied to the previous action will be applied to the new action. Therefore, if the speed of two sequential actions is to be equal, then it is not necessary to repeat the Multiplier command for the second action. Likewise, the Transition, Hold, Track Point, Tracker Joint, Target, and Expression values will be unchanged unless new commands of those types have been fetched from the Command Sequence Buffer. However, the Joint Override value is overridden during execution of the Animation Engine Cycle, as will be described in the discussion of FIG. 10.

Referring again to FIG. 9, and particularly to blocks 960 to 980, the various methods for entering commands into the Command Sequence Buffer 950 will now be discussed. Commands may be input from an External Application 960 or may be generated by the Character Animation System as shown in block 980. Referring first to commands generated by an External Application, these commands are first evaluated by test 962 to determine whether they are of a High-Level type requiring further processing prior to being entered into the Command Sequence. A command is considered to be high level if it is not one of the types identified in FIG. 7. If a command is not of a High-Level type, then it is entered directly into the Command Sequence 950. If the command is of a high-level type, then it is evaluated by test 964 to determine if it is of the IK, also known as Inverse Kinematics, type. If it is of the IK type, then it is processed by block 970 to resolve it into lower level commands that are then placed into the Command Sequence. The elements of this process are described later in this specification, beginning with the discussion of FIG. 12.

An additional method for entering commands into the Command Sequence Buffer is illustrated by blocks 972 through 982. This method generates pseudo-random command sequences representative of the direction or diversion of attention of a real human character. This method is initiated by the generation of a Random Number P between 0 and 1. The number is generated either in response to a high level command, not of the IK type, input from the External Application 960, or in response to no commands of the low-level type being present in the Command Sequence 950. The number P is tested in block 974 to determine if it is less than a Shift Gaze Probability that is set at program initialization. If P is less than the Shift Gaze Probability, then block 980 generates a random track point command, followed by a Track Mode Command, in which the tracker joint or joints are the head, the eyes, or both the head and the eyes; and the tracker target in the Track Point, the User, or a joint in the hierarchy of the character. The visual result of these commands, after execution by the Animation Engine Cycle, is a shifting in gaze by the animated character. Depending on the random selection of track joints and tracker targets, the character appears to shift gaze naturally between attention to the user, to the avatar's own body, and to random points in the environment. Since the Rendering System keeps track of the user position relative to the character, the character's gaze appears to shift based on the user's movement. In this manner the character will periodically return its gaze to the location of the user, thereby representing the actions of a real person who is awaiting instructions from the user. The character will periodically return its attention to the user no matter where the user has been located within the character's environment, thus adding to the realism of the character's actions.

If the random number P is greater than the Shift Gaze Probability P, then block 982 randomly selects a sequence of commands from the Embedded Behavior Library 109. These sequences include action and expression commands that represent natural weight shifts and other fidgets of the character body and face.

Figure 10A:
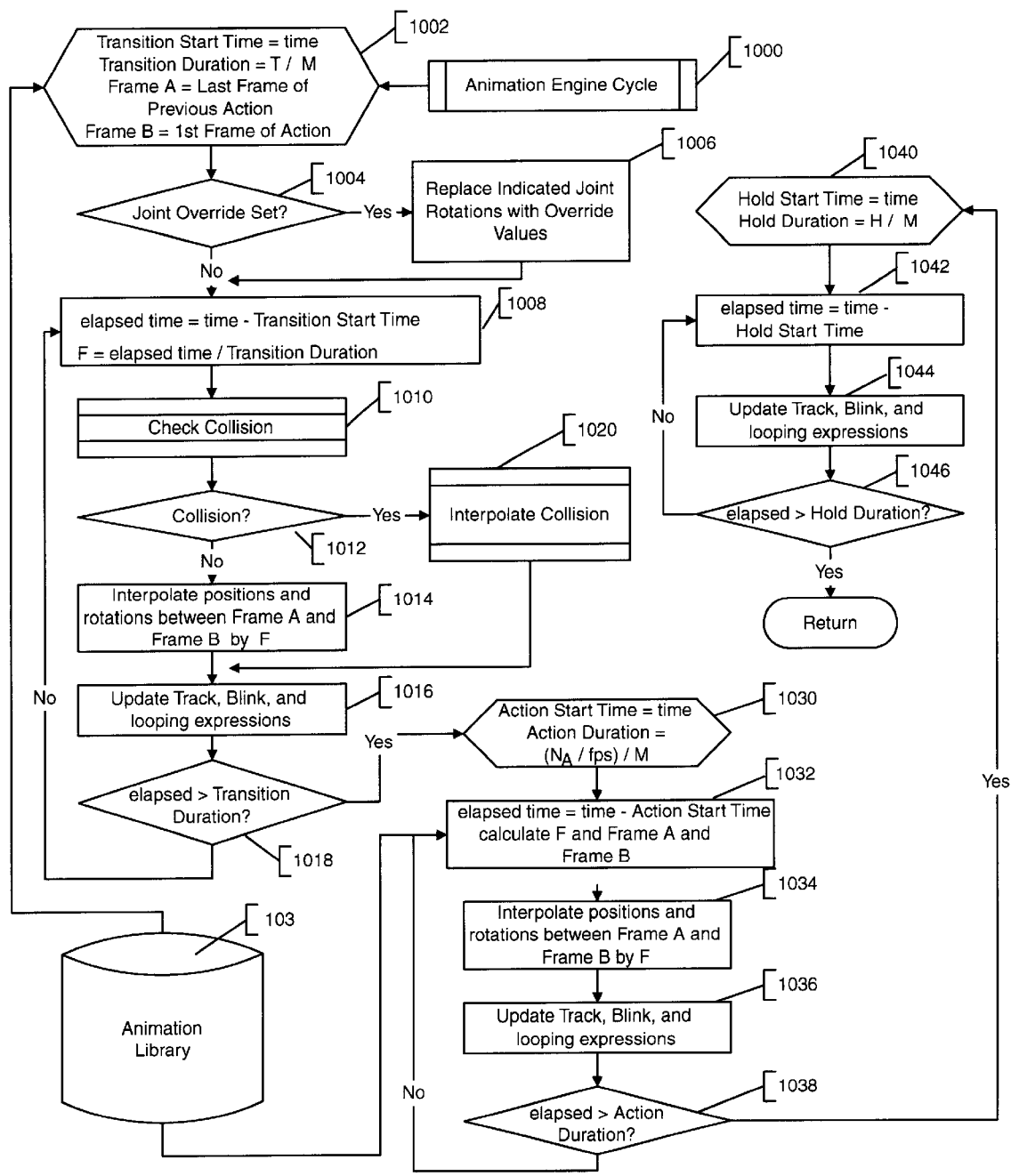
Figure 11:
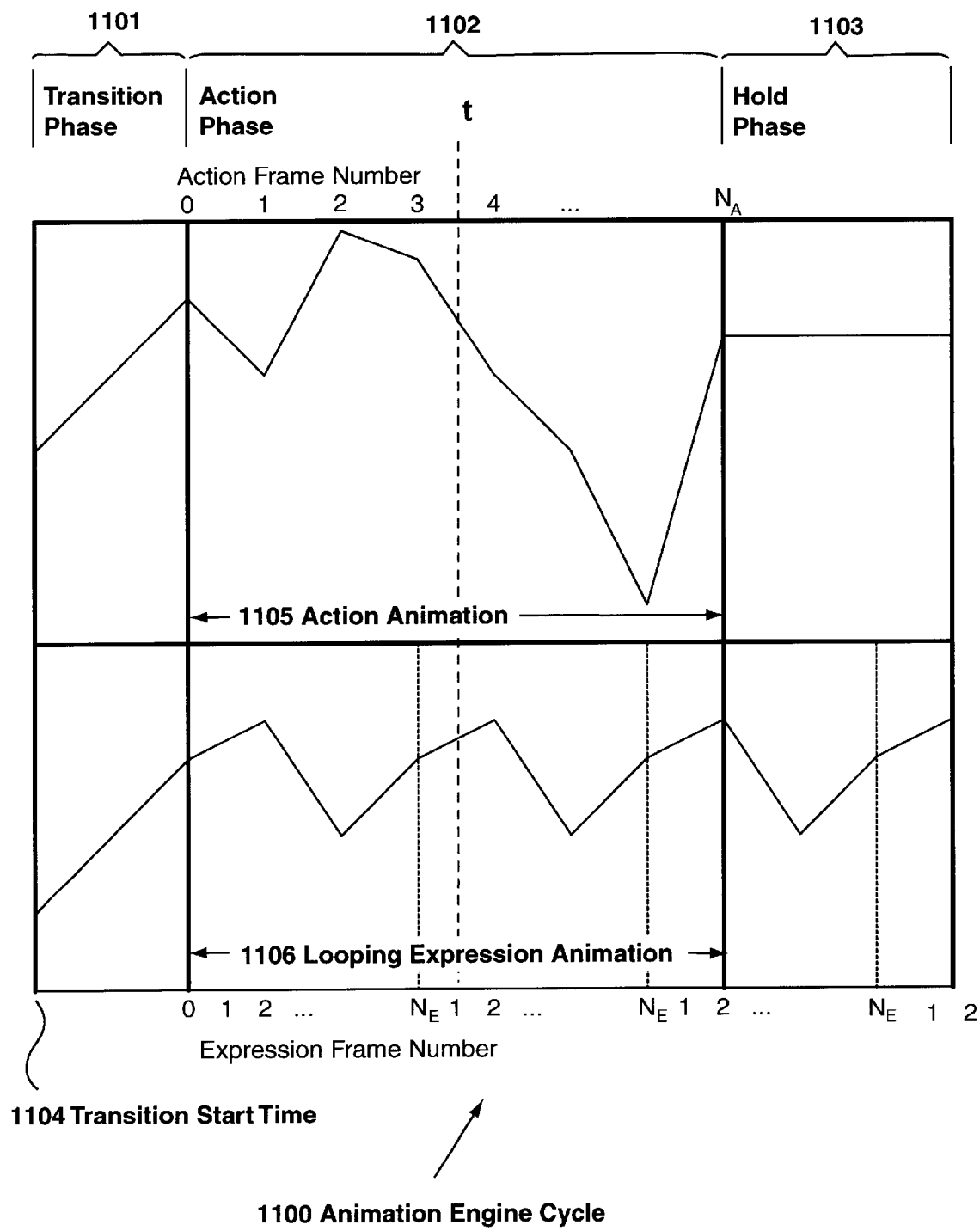
FIG. 11 is a timing diagram illustrating interpolation of actions, expression, transitions, and holds.

FIG. 10, including FIGS. 10a and 10b, illustrates the processes of the Animation Engine Cycle 940. The description of the Animation Engine Cycle will also make references to FIG. 11, which illustrates the relative timing of the processes illustrated in the flow charts of FIGS. 10a and 10b. As shown in FIG. 11, there are three phases to each Animation Engine Cycle: a Transition phase, an Action phase, and a Hold phase. The Transition phase ensures a smooth, collision-free motion from the final state of the previous Animation Engine Cycle to the first frame of the next cycle. This phase is described in blocks 1002 through 1018 of FIG. 10a. The Transition phase is followed by an Action phase, during which the motions associated with commanded actions and expressions are computed and displayed. This phase is described in blocks 1030 through 1038 of FIG. 10a. The final phase of the Animation Engine Cycle is the Hold cycle. During this phase, the final state of the commanded action is held for the commanded hold time. This phase is described in blocks 1040 through 1046 of FIG. 10a.

Referring to FIG. 10a, the Animation Engine Cycle begins with the initialization process 1002. In this process, the Transition Start Time is set to the current time, as indicated by the computer real-time clock. For successful operation, this real-time clock must record time in units less than one millisecond. A Transition Duration is computed by dividing the Transition Time T, which was set by operation 916, by the Multiplier M, which was set by operation 912. Two arrays of rotation and vertex values are then loaded, these being identified as Frame A and Frame B. In this context, Frame refers to the array of joint rotation and vertex location values to be applied at a given frame time. Frame A is set to be the array of joint rotations and vertex locations for the last frame time of the previous action and expression, as stored in the Animation Library 960. Frame B is set to be the array joint rotation and vertex location values for the first frame time of the most recently commanded action and expression, also as stored in Animation Library 960. This sets up the Transition phase of the Timing Diagram shown in FIG. 11.

After initialization 1002, block 1004 tests whether process 936 set the Joint Override with rotation values. If Joint Override has been set, process 1006 replaces the joint rotations in Frame B that were set by process 936 with the corresponding rotations. Process 1008 then calculates the elapsed time by subtracting the start time of the transition from the current time. The interpolation fraction F is also calculated by dividing the elapsed time by the intended Transition Duration.

The Animation Engine Cycle then performs Check Collision 1010 to determine if a normal interpolation between the last state of the previous action and the current commanded action would cause a collision. The details of Check Collision will be described later in the discussion of FIG. 10b. Block 1012 then tests the results of Check Collision. If no collision is detected, normal interpolation between Frame A and Frame B is performed by process 1014. The results of spherical linear interpolation between the joint rotations in Frame A and the joint rotations in Frame B with weight F is sent to the Rendering System 107. The results of linear interpolation between the vertex locations in Frame A and the vertex in Frame B with weight F is also sent to the Rendering System 107. If a collision is detected, a special Interpolate Collision 1020 process is necessary to avoid collision in the interpolation from Frame A to Frame B. The details of Interpolate Collision will be described later in the discussion of FIG. 10b. After Interpolate Collision, the Animation Engine Cycle bypasses process 1014 and continues on to process 1016. Process 1016 updates other processes that do not depend on the timing of the Animation Engine Cycle 1100 depicted in FIG. 11. Each Animation Engine Cycle includes a Transition Phase 1101, an Action Phase 1102, and a Hold Phase 1103. Blinking, tracking, and looping expressions keep track of their own timing and simply require notification to update their display to the Rendering System based on the current time. Blinking is accomplished by rotating the eyelids about the appropriate axis. Tracking will be described in detail in conjunction with FIG. 23. The discussion of the Action phase of FIG. 11 will review looping expressions in more detail. After computing tracking, blinking, looping expressions, and joint rotations based on the current time, test 1018 determines if the elapsed time is greater than the time allotted for the transition. If the elapsed is less than the Transition Duration, the process cycles back to 1008, where elapsed time and fraction F are recomputed based on the new current time. This cycle from process 1008 to test 1018 is depicted in the Transition phase of FIG. 11.

Transition Phase 1101 in FIG. 11 shows the start of an Animation Engine Cycle for an action that does not collide with the previous action, and for a new looping expression. The Action Joint Rotations are linearly interpolated from the Transition Start Time 1104 to Frame 0 of Action Animation 1105. The Expression Vertex Locations are linearly interpolated from the Transition Start Time 1104 to Frame 0 of the looping expression animation 1106.

When the elapsed time is greater than the Transition Duration, the Animation Engine Cycle initializes the Action phase at block 1030. The Action Start Time is set to the current time. The Action Duration is computed by dividing $N_A$, the number frames in the action animation shown in FIG. 11, by the frames per second (fps), and dividing the result by the multiplier as set by process 912. Once initialized, the Action phase cycles through 1032 to 1038. Process 1032 calculates the elapsed time by subtracting the start time of the action from the current time. The interpolation fraction F are calculated by determining which frame numbers of the action animation the elapsed time falls between, and the appropriate weight remaining. Frame A is set to the array of joint rotations from Animation Library 103 at the first of these frame numbers. Frame B is set to the array of joint rotations from Animation Library 103 at the second of these frame numbers. The vertex locations for the looping expression, however, will be handled by process 1036. In process 1034, the results of linear interpolation between the vertex locations in Frame A and the vertex in Frame B with weight F is also sent to the Rendering System 107. Then process 1036 updates tracking, blinking, and looping expressions based on the current time. At the end of this cycle, test 1038 determines if the elapsed time is greater than the time allotted for the action. If the elapsed time is less than or equal to the Action Duration, the process cycles back to 1032 where elapsed time, F, Frame A, and Frame B are recomputed based on the new current time. This cycle from process 1032 to test 1038 is depicted in the Action Phase 1102 of FIG. 11.

The Action Phase 1102 of FIG. 11 shows the animation of Action Joint Rotations from Frame 0 to Frame $N_A$. It also shows the animation of Expression Vertex Locations for an expression animation whose last frame number $N_E$ is less than $N_A$, and which therefore loops. At time t, on FIG. 11, process 1032 sets Frame A to the joint rotations at Frame Number 3 of this action in the Animation Library 103 and Frame B to the joint rotations at Frame Number 4. F is set to 0.5, which is the fraction between Frame Number 3 and Frame Number 4 at which time t lies. For process 1036, The Expression Vertex Locations rendered are an interpolation of the vertex locations at Frame Number 1 and Frame Number 2 of the Animation Library 103 at the expression set by process 932. Note that in a valid looping expression, the first frame and last frame are identical.

When the elapsed time is greater than the Action Duration, the Animation Engine Cycle initializes the Hold Phase in process 1040. The Hold Start Time is set to the current time. The Hold Duration is computed by dividing the Hold Time H, which was set by operation 920, by the Multiplier M, which was set by operation 912. Once initialized, the Hold phase cycles from 1042 though 1046. Process 1042 calculates the elapsed time by subtracting the start time of the hold from the current time. Then process 1044 updates tracking, blinking, and looping expressions based on the current time. At the end of this cycle, test 1046 determines if the elapsed time is greater than the time allotted for the hold. If the elapsed time is less than the Hold Duration, the process cycles back to 1042 where elapsed time is recomputed based on the new current time. This cycle from process 1042 to test 1046 is depicted in the Hold Phase 1103 of FIG. 11.

During the Hold Phase 1103, the Action Joint Rotations are not animated but Expression Vertex Locations for looping expressions continue to be animated by process 1044 in the same manner as process 1036. The right edge of FIG. 11 shows the final values of the Action Joint Rotations and Expression Vertex Rotations for this Animation Engine Cycle. The next Animation Engine Cycle would start with these values at the left edge for smooth transition into the next action. If a new expression is not commanded for the next Animation Engine Cycle, the looping expression will continue in process 1016. When the elapsed time is greater than the Hold Duration, the Animation Engine Cycle 1100 returns control to block 940 in FIG. 9.

The Check Collision process 1010, which is referenced in FIG. 10a and defined in FIG. 10b, begins with test 1062. If the commanded action is the same as the previously commanded action, then process 1064 sets Collision to false and returns. If the commanded action is not the same as the previously commanded action, then process 1066 uses the index of the current action commanded by 939 and the index of the previous action performed by the Animation Engine Cycle to access the Transition Table 104. The Transition Table 104 contains an entry for every action in the Animation Library 103. Each entry has a Collision List, which is an ordered list of subsequent actions that would cause a collision during the Transition phase of the Animation Engine Cycle FIG. 10a. For each such subsequent action there is stored an Intermediate Posture which, if inserted between the two actions, will cause the collision to be avoided. Process 1066 searches the Transition Table 104 for an Intermediate Posture entry for the (Last Action, Action) pair. If no entry is found for that pair, then process 1072 sets Collision to false and returns. If an entry is found, then process 1074 retrieves the Intermediate Frame stored in the Animation Library 103 for that Intermediate Posture. The Intermediate Frame is an array of joint rotations, of the same form as a single frame of any animation. Finally, process 1074 sets Collision to true and returns to block 1010 in FIG. 10a.

Interpolate Collision, which is referenced in block 1020 in FIG. 10a and defined in FIG. 10b, begins with test 1082. 1082 determines whether the transition interpolation is in the first half or second half by evaluating F, set by process 1008. If F is less than 0.5, then interpolation between Frame A, set by 1002, and the Intermediate Frame, set by 1074, is performed by process 1084. The results of spherical linear interpolation between the joint rotations in Frame A and the joint rotations in the Intermediate Frame with weight (2*F) is sent to the Rendering System 107. If F is greater than or equal to 0.5, then interpolation between the Intermediate Frame, set by 1074, and Frame B, set by 1002, is performed by process 1086. The results of spherical linear interpolation between the joint rotations in the Intermediate Frame and the joint rotations in Frame B with weight (F−0.5)*2 is sent to the Rendering System 107. At the end of Check Collision control is returned to process 1020 in FIG. 10a.

Referring back to FIG. 9, it has been indicated that an alternate method for generating command sequences using Inverse Kinematics (IK) is provided by process 970, Process IK Command. This method is selected when the objective is to direct one of the character's hands to a specific desired position and orientation. In this case, the Character Animation System computes the shoulder, elbow, and wrist joint orientations that place the hand in the desired position and orientation, thereby providing a simpler and more flexible interface for the External Application 960. The method will be described for the case where the wrist joint position and orientation are commanded. However, the method may use the position and orientation of any other point on the hand. In this case, the knowledge of the hand position and orientation will be used to first compute the wrist position and orientation. The example also uses the right arm and hand for illustration. However, the method may also be applied to the left arm and hand, or to both arms and hands simultaneously.

Figure 12:
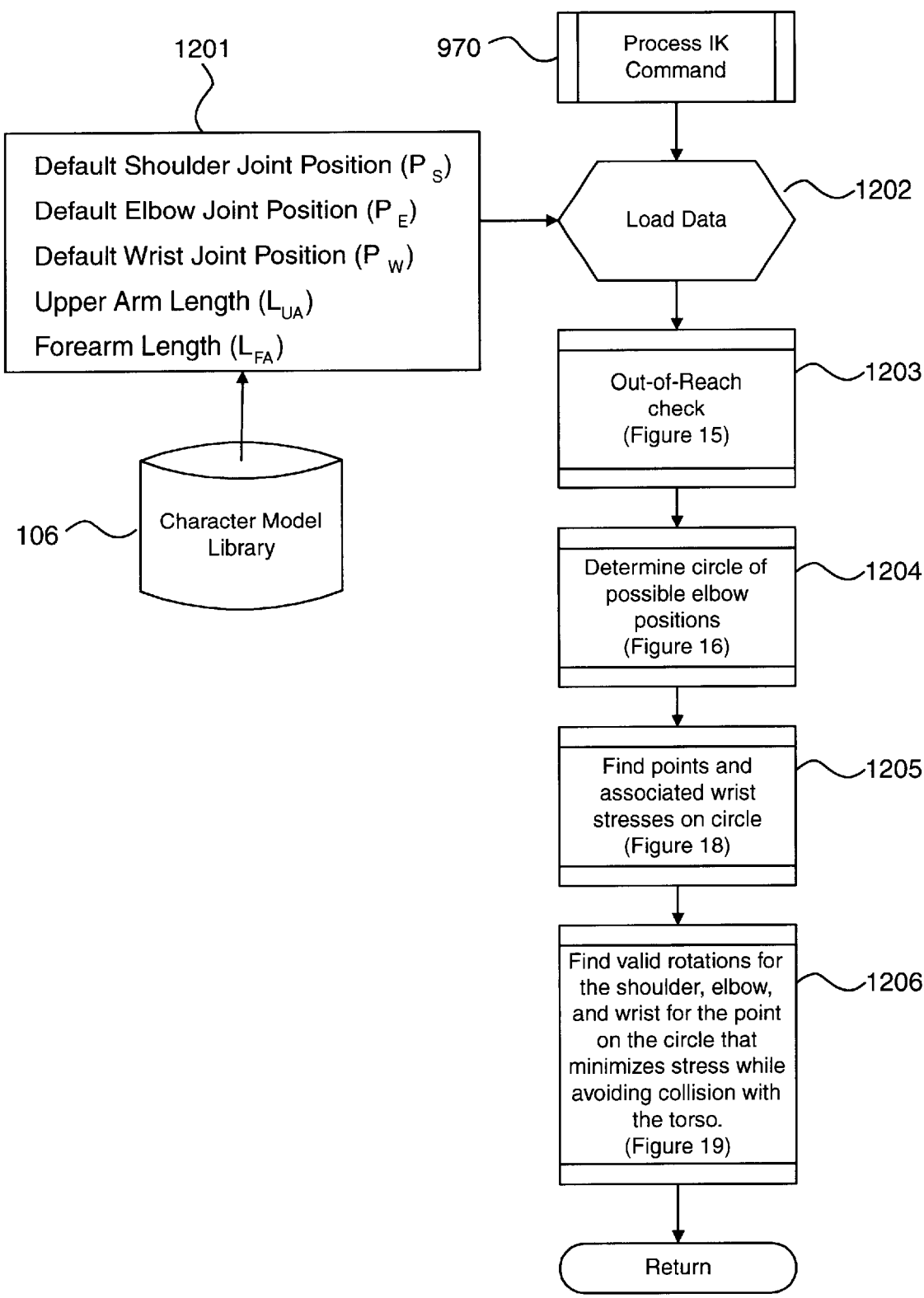
FIG. 12 is a flow diagram illustrating the computation of arm joint rotations given a desired wrist position and orientation.
Figure 13:
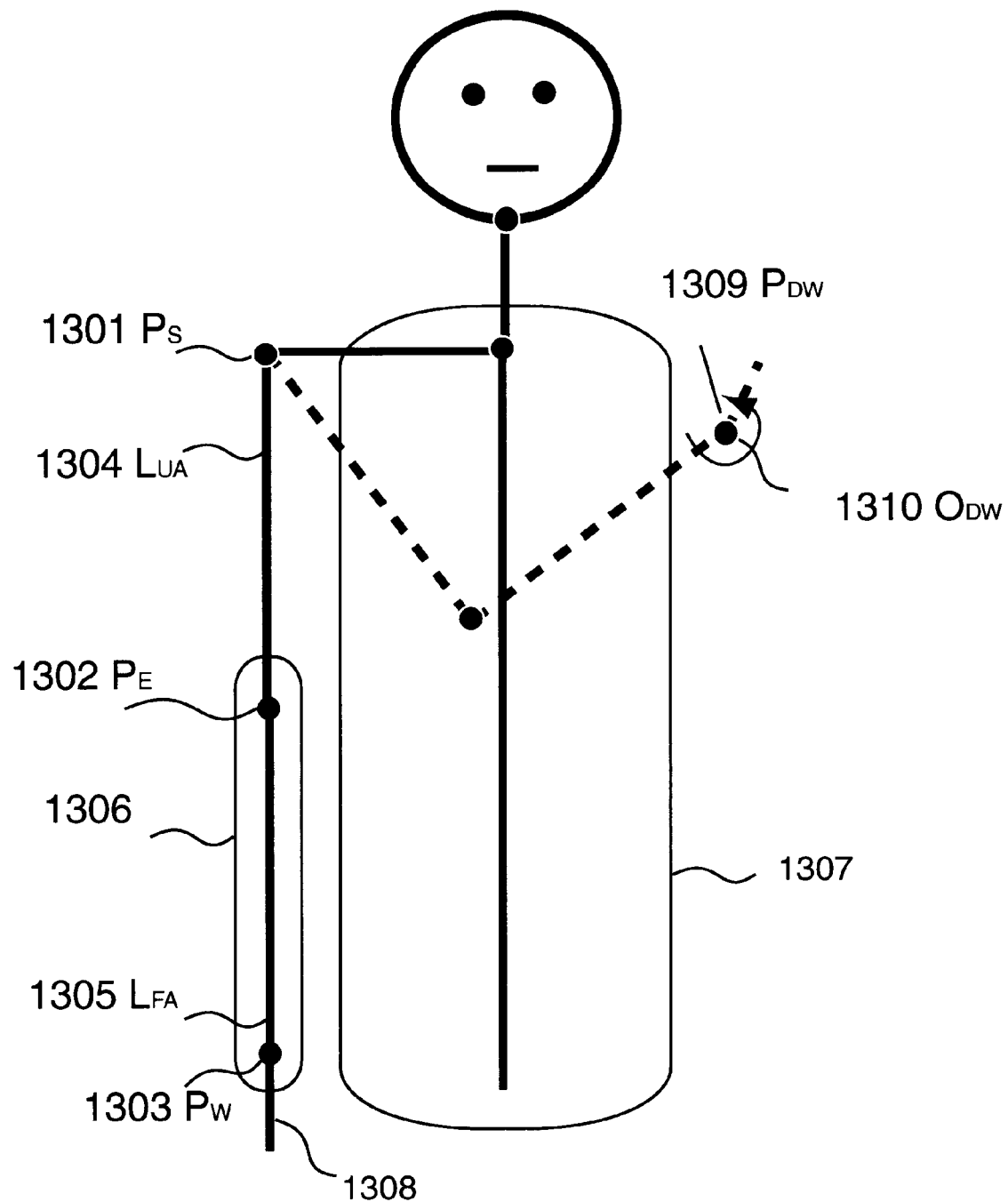
FIG. 13 illustrates a graphic structure for arm joints and segments.

FIGS. 12 and 13 illustrate the general method for processing an IK command. The method attempts to achieve a commanded desired wrist position ($P_{DW}$) 1309 and orientation ($O_{DW}$) 1310, as shown in FIG. 13. FIG. 13 also shows the default shoulder ($P_S$) 1301, elbow ($P_E$) 1302, and wrist ($P_W$) 1303 joint positions. The objective of this method is to solve for rotations in the shoulder, elbow, and wrist joints to place the wrist 1303 and hand 1309 in accordance with $P_{DW}$ and $O_{DW}$. These rotations are computed so as to not exceed their rotation limits, and such that the segments will not go through each other. In a first process 1201, $P_S$, $P_E$, and $P_W$, as well as Upper Arm Length $L_{UA}$ 1304 and Forearm Length $L_{FA}$ 1305, Default Torso Collision Volume 1307, and Default Arm Collision Volume 1306, are loaded from Character Model Library 106.

The torso and arm collision volumes will be described later as part of the discussion of FIGS. 20 and 21. This data is loaded in preparation from the Character Model Library 106.

Figure 14:
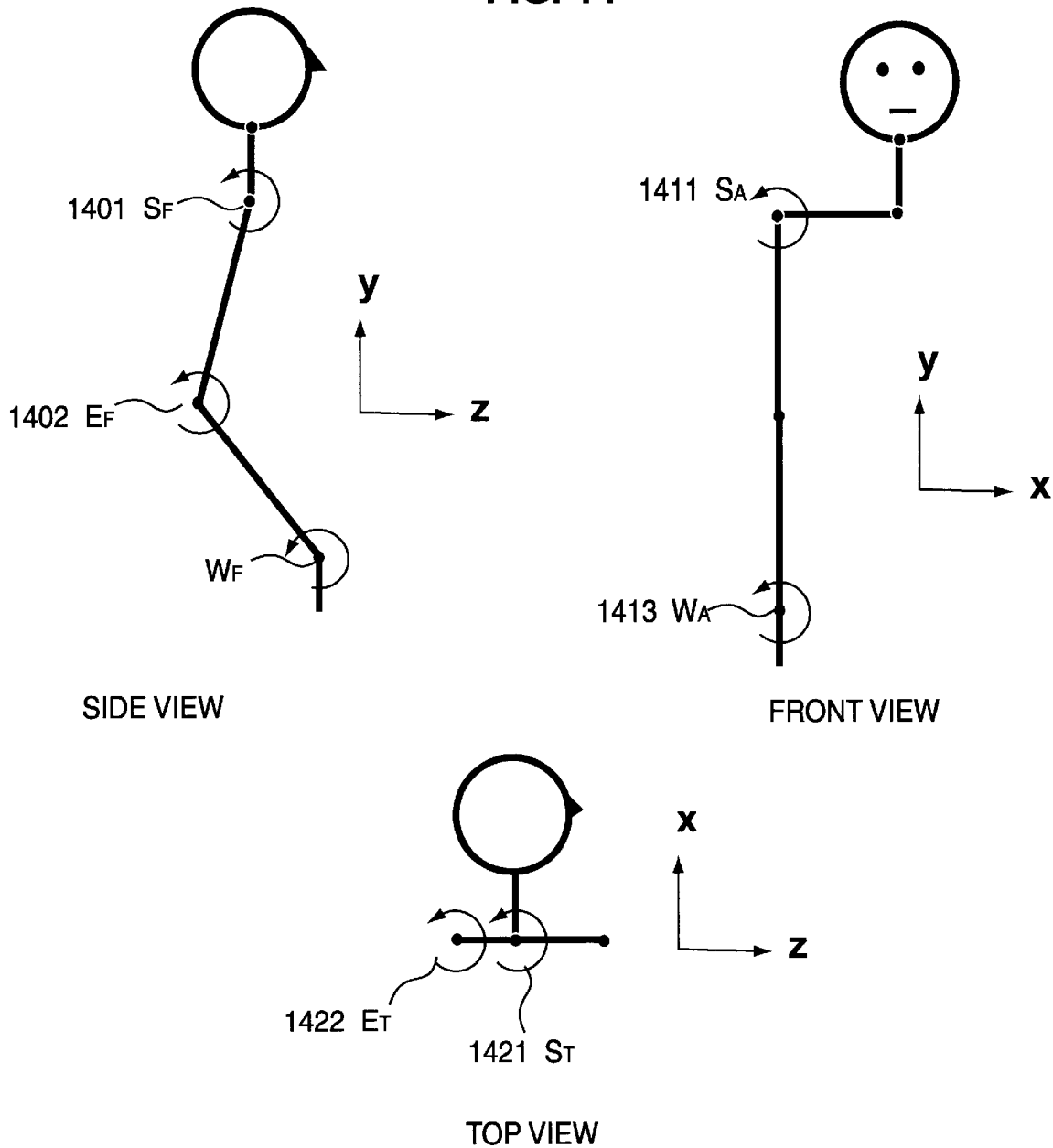
FIG. 14 illustrates arm joint rotations that are to be computed.

FIG. 14 shows the arm joint rotations separated into rotations along each of the relevant major axes. These rotations are to be computed by this method. The full shoulder joint rotation, $S_R$, consists of the shoulder flexion ($S_F$) 1401, shoulder abduction ($S_A$) 1411, and shoulder twisting ($S_T$) 1421. $S_F$ is a rotation about the negative x-axis. $S_A$ is a rotation about the negative z-axis. $S_T$ is a rotation about the negative y-axis. The full elbow joint rotation consists of the elbow flexion ($E_F$) 1402 and elbow twisting ($E_T$) 1422. $E_F$ is a rotation about the negative x-axis. $E_T$ is a rotation about the negative y-axis. The full wrist joint rotation, $W_R$, consists of the wrist flexion ($W_F$) 1403 and wrist pivot ($W_P$) 1413. $W_F$ is a rotation about the negative z-axis. $W_P$ is a rotation about the negative x-axis.

The Process IK Command method 970 includes four major subprocesses: Out-of-reach check 1203, Determine circle of possible elbow positions 1204, Find points and associated wrist stresses on the circle 1205, and Find valid rotations for the shoulder, elbow, and wrist 1206, as shown in FIG. 12. These will be described in the following paragraphs.

Figure 15:
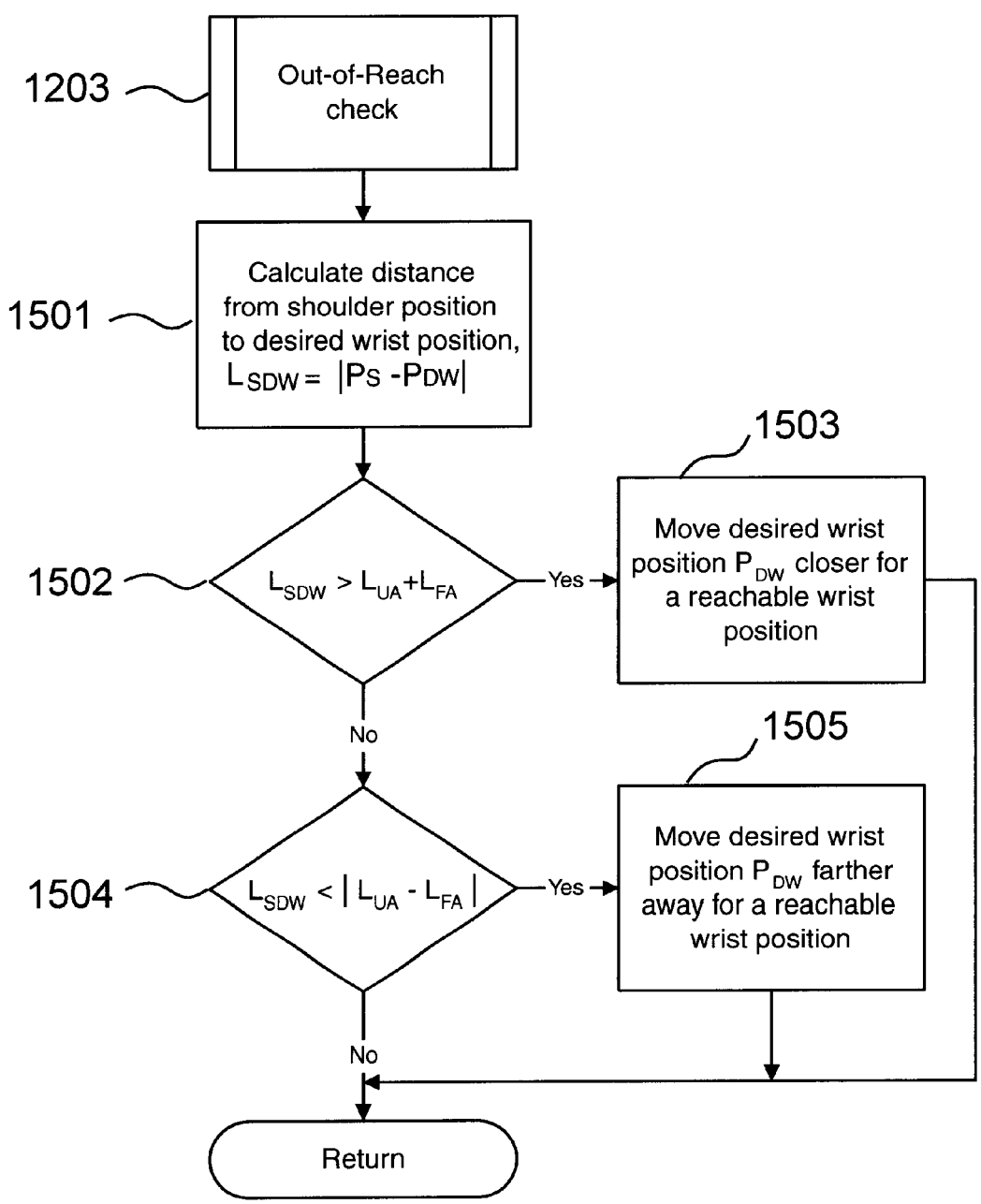
FIG. 15 illustrates a method for testing and correcting an out-of-reach state.

FIG. 15 shows the first process, Out-of-reach check 1203, in the IK algorithm. This is a check to determine whether the desired wrist position is reachable. The distance $L_{SDW}$ from $P_S$ to $P_{DW}$ is first computed, as shown in process 1501:

$$L_{SDW} = |P_S - P_{DW}|$$

In test 1502, $L_{SDW}$ is compared to the sum of $L_{UA}$ and $L_{FA}$. If $L_{SDW}$ is greater than $L_{UA}$ plus $L_{FA}$, then $P_{DW}$ is too far from $P_S$ to be reachable. In this case, $P_{DW}$ will be moved towards the shoulder along the line between $P_S$ and $P_{DW}$, according to process 1503.

If $L_{SDW}$ is not greater than $L_{UA}$ plus $L_{FA}$, then a second test 1504 is applied. If $L_{SDW}$ is less than the absolute value of the difference of $L_{UA}$ and $L_{FA}$, then $P_{DW}$ is too close to $P_S$ to be reachable. In this case, $P_{DW}$ is moved away from the shoulder along the line between $P_S$ and $P_{DW}$, according to process 1505.

Figure 16:
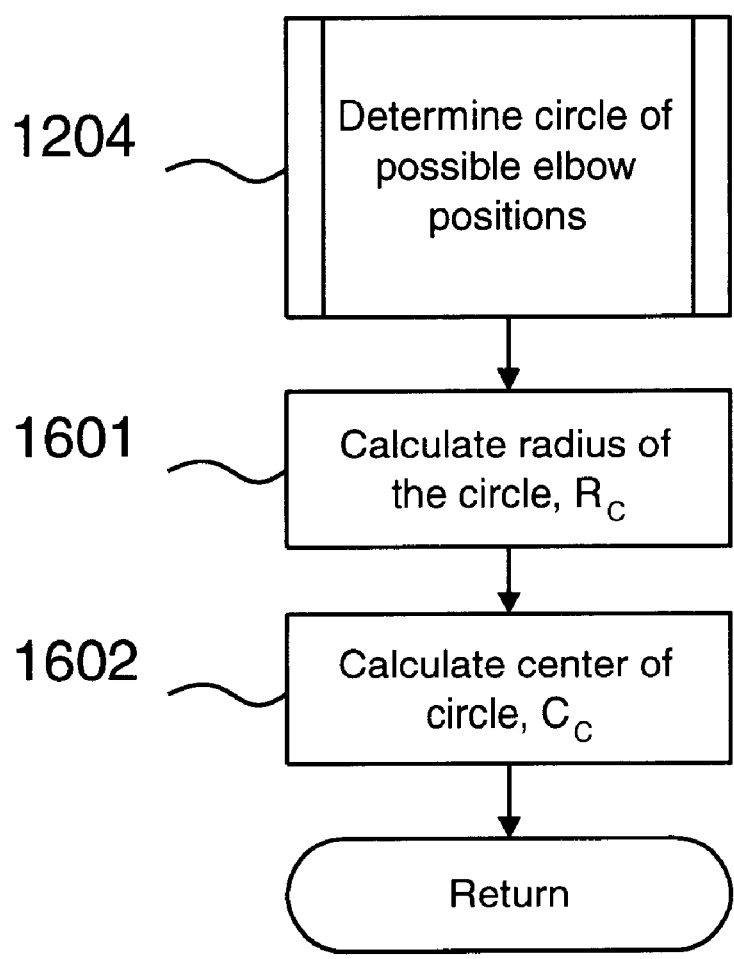
FIG. 16 illustrates a method for determining a circle of possible elbow positions.
Figure 17:
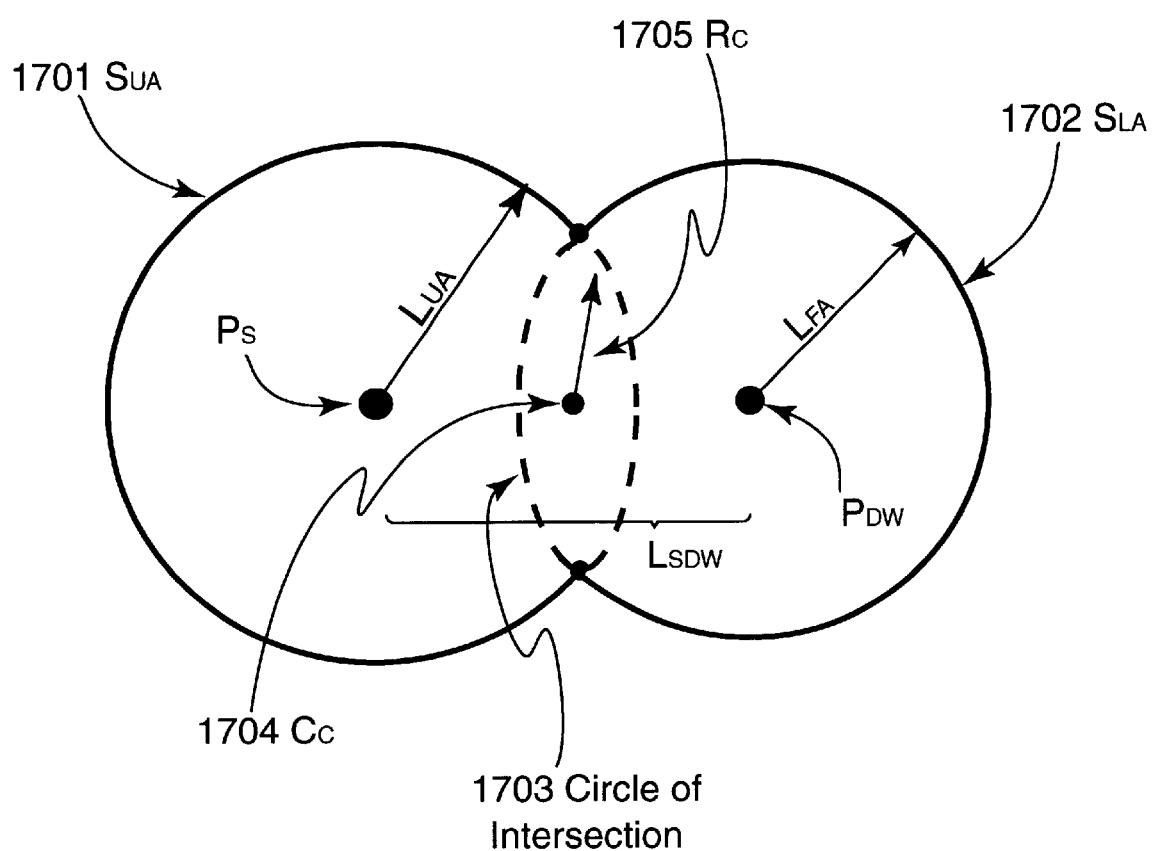
FIG. 17 illustrates a method for intersecting two spheres to determine a circle of possible elbow positions.

FIGS. 16 and 17 show the next process in the IK algorithm. An Upper Arm Sphere ($S_{UA}$) 1701 is defined to be a hollow sphere with its center at $P_S$ and its radius equal to $L_{UA}$. A Forearm Sphere ($S_{FA}$) 1702 is defined to be a hollow sphere with its center at $P_{DW}$ and its radius equal to $L_{FA}$. Unless the elbow is opened such that the forearm and upper arm are exactly parallel, these two spheres will intersect in a circle. This Circle of Intersection 1703 is the set of possible locations for the elbow position $P_E$, for the desired wrist position $P_{DW}$. Using well-known formulas, the center ($C_C$) 1704 and radius ($R_C$) 1705 of this circle are computed, as shown in processes 1602 and 1601, respectively.

Figure 18:
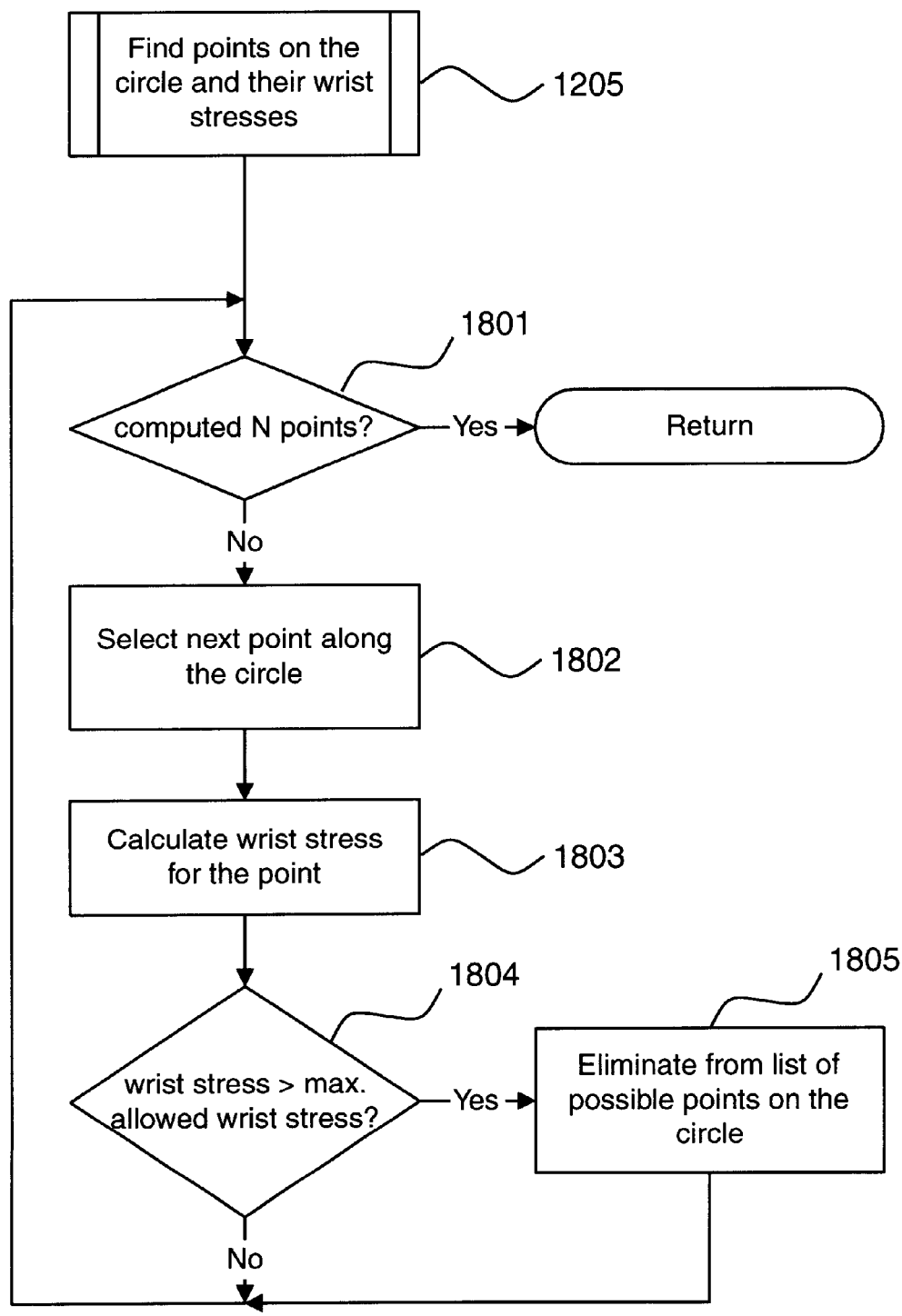
FIG. 18 is a flow diagram illustrating a process for finding a circle of elbow positions and their associated wrist stresses.

FIG. 18 shows the third process in the IK algorithm, Find points on the circle and their wrist stresses 1205. This process evaluates a set of N points along the Circle of Intersection 1703, and calculates the stress on the wrist for each of these points. The value of N may be selected based on the desired accuracy and computational power, but will generally be greater than twelve. For each point a test 1801 is applied to determine whether all N point have been computed. If yes, then this process is complete. If not, then the algorithm performs steps 1802, Select next point along the circle, and 1803, Calculate wrist stress for the point. Any appropriate formula for wrist stress may be used, depending on the desired computational accuracy and efficiency. Most commonly, a function that increases with ascending magnitude of wrist flexion and wrist abduction will be used. In test 1804, the wrist stress compared to a defined maximum acceptable wrist stress. If the stress is greater than the maximum acceptable wrist stress, the point is deleted from a list of acceptable points, according to step 1805.

Figure 19:
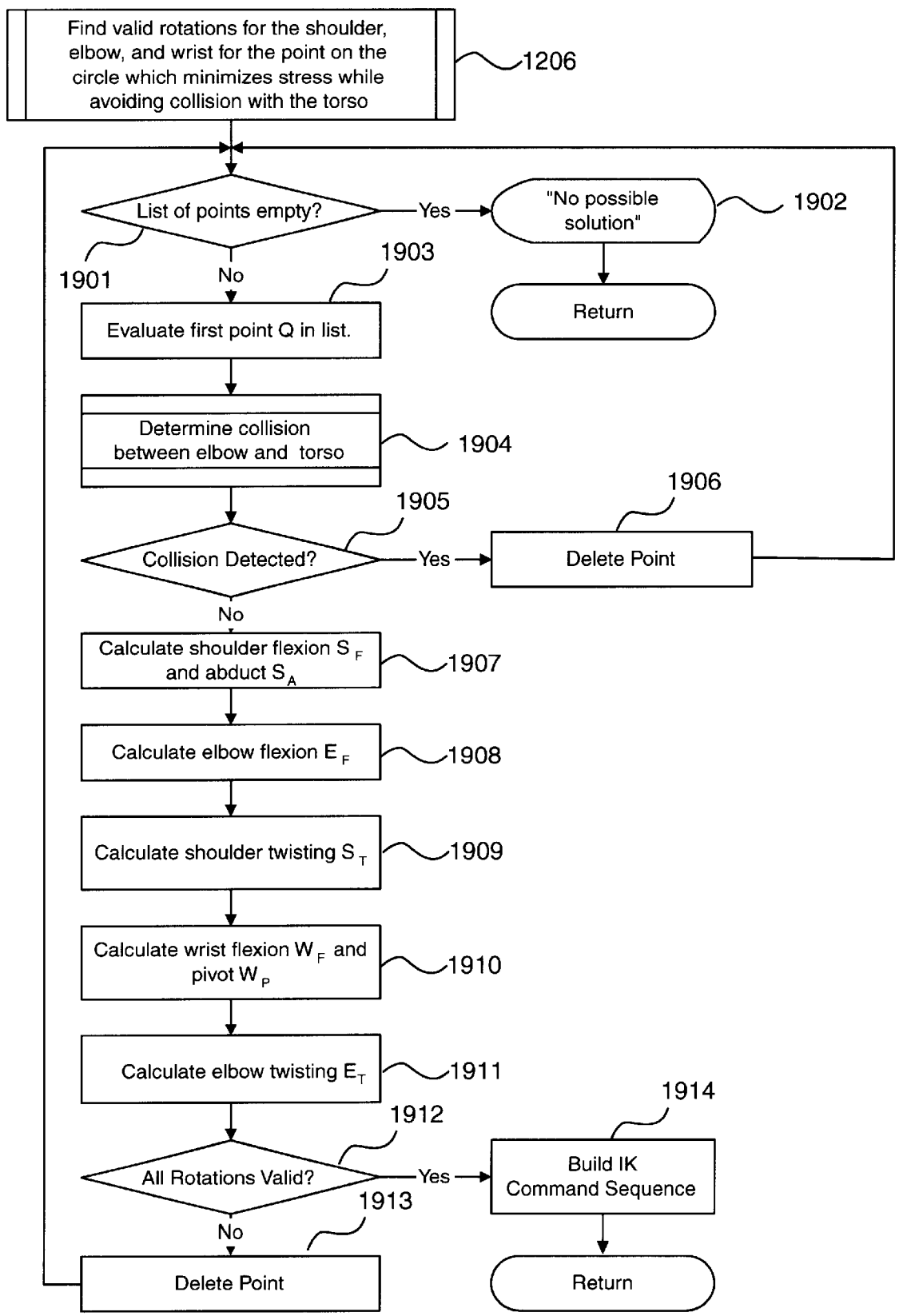
FIG. 19 is a flow diagram for explaining a process for computing arm joint rotations that minimize stress while avoiding collision with a torso.

FIG. 19 shows the process 1206 of finding acceptable shoulder, elbow, and wrist rotations that place the wrist at the desired position and orientation. The process evaluates the list of points, sorted by ascending wrist stress, which was computed in process 1205. A first test 1901 determines whether the list of points is empty. If $P_{LS}$ is empty, the message "No possible solution" 1902 is reported. If not empty, the first point in the list is evaluated, according to process 1903. A process 1904 is applied to evaluate collision between the elbow and torso. This process will be described in detail in connection with FIGS. 20A and 20B.

Figure 20A:
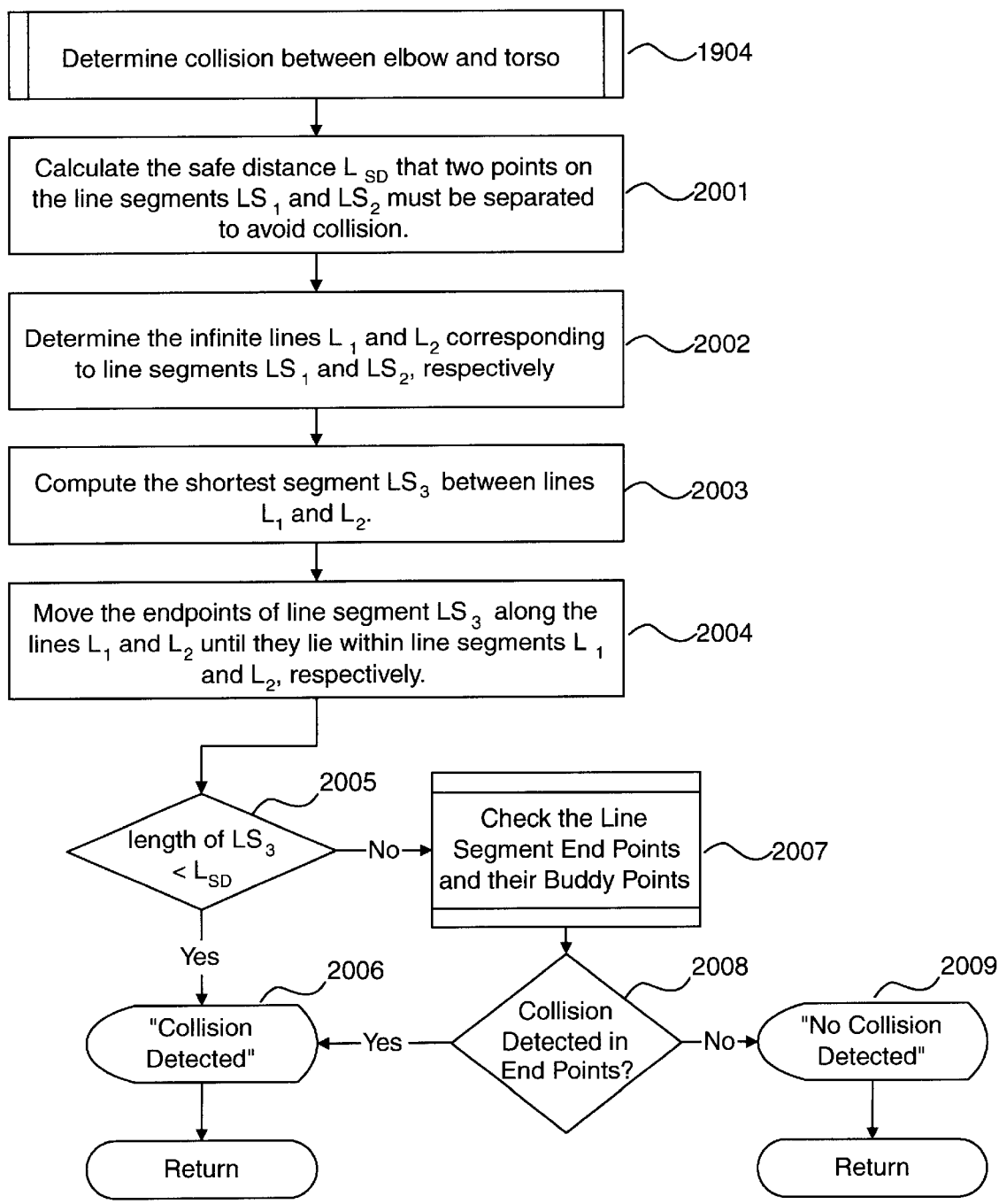
FIGS. 20a and 20b are flow diagrams illustrating a method for determining arm collisions with a torso.

If the collision detection test 1905 detects a collision, the point is removed from the list and the next point is tested. If no collision is detected, then the joint rotations are calculated in the following order: $S_F$ and $S_A$, $E_F$, $S_T$, $W_F$ and $W_P$, and finally $E_T$, according to steps 1907, 1908, 1909, 1910, and 1911. These joint rotation calculations will be described in connection with FIGS. 22A, 22B, and 22C. Turning first to process 1904, FIG. 20A shows the process of collision detection. Collision detection between body segments is accomplished using collision volumes approximating the body segments. Alternately, a body segment could be represented by multiple volumes. Only specified pairs of the collision volumes are tested. FIG. 21A shows the collision volumes 2101 and 2102. Volume 2101 is defined by two points, $P_1$ and $P_2$, and a radius $R_{C1}$. $LS_1$ is defined as the line segment from $P_1$ to $P_2$. Volume 2102 is defined by two points, $P_3$ and $P_4$, and a radius $R_{C2}$. $LS_2$ is defined as the line segment from $P_3$ to $P_4$. In process 2001, a safe distance, $L_{SD}$, is computed. This is the minimum distance by which any two points on line segments $LS_1$ and $LS_2$ must be separated to assure that there is no collision. From FIG. 20A, it can be seen that the sum of the radii of the two cylinders, $R_{C1}+R_{C2}$ can provide this distance:

$$L_{SD} = R_{C1} + R_{C2}$$

Now the minimum distance between $LS_1$ and $LS_2$ is computed. Corresponding to the Line Segments $LS_1$ and $LS_2$, there are infinite lines, $L_1$ and $L_2$, respectively, as shown in FIG. 21A. These are computed in process 2002. The shortest line segment, $LS_3$, between the infinite lines is computed in process 2003. In process 2004, the two points defining $LS_3$ are moved along the infinite lines until both points are in $L_1$ and $L_2$, respectively. Test 2005 compares the length of $LS_3$ with $L_{SD}$. If the length of the modified $LS_3$ is shorter than $L_{SD}$, there is a collision between the cylindrical portions of volumes 2101 and 2102, and message 2006, "Collision Detected", is reported.

Figure 20B:
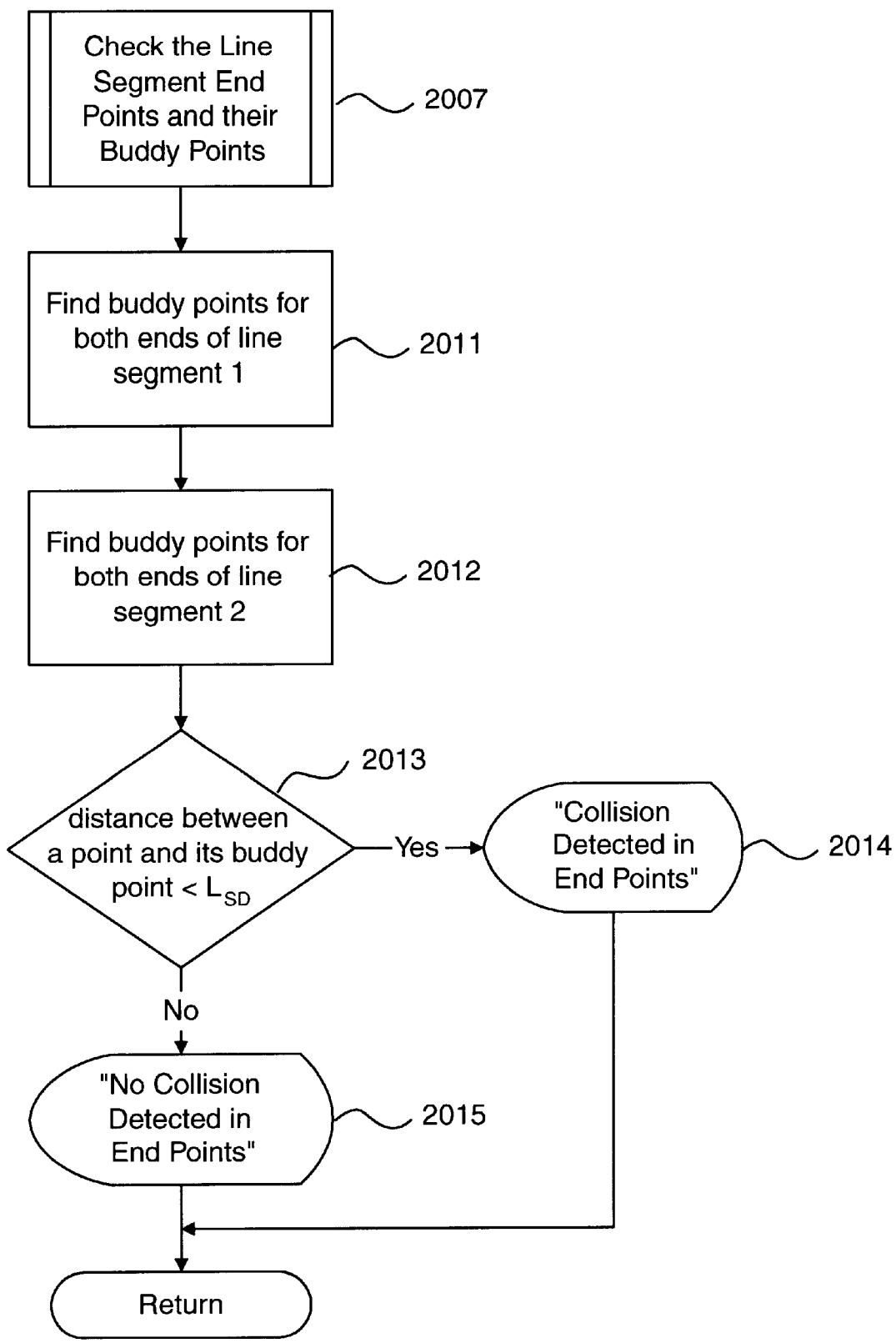

If no collision is detected by test 2005, there is still the possibility that there is a collision with the hemispherical cap of one of the segments. This collision type is evaluated in process 2007. FIG. 20B shows the testing of the caps. The end points of the line segments and their "buddy points" are tested. A buddy point is defined to be the closest point on a line segment to a specified end point on the other line segment. FIG. 21B shows the end points $P_1$ through $P_4$ and their corresponding buddy points $P_{1BP}$ through $P_{4BP}$. In process 2011, the buddy points for volume 2101 are determined: $P_1$'s buddy point $P_{1BP}$ and $P_2$'s buddy point $P_{2BP}$. In process 2012, the buddy points for volume 2102 are determined: $P_3$'s buddy point $P_{3BP}$ and $P_4$'s buddy point $P_{4BP}$. To find the buddy point $P_{1BP}$ of $P_1$, a point $P_{1C}$ is defined to be the point on the line $L_2$ closest to $P_1$. $P_{1C}$ is calculated using any one of the well-known algorithms to find the distance from a point to a line in space. If $P_{1C}$ is on the line segment $LS_2$, then $P_{1BP}$ will be equal to $P_{1C}$. If $P_{1C}$ is not on the line segment $LS_2$, then $P_{1BP}$ will be equal to $P_3$ or $P_4$ depending on which one is closest to $P_{1C}$. The distance between each end point and its buddy point are evaluated in test 2013. If any of the distances from the end points $P_1$ through $P_4$ to their corresponding buddy points $P_{1BP}$ through $P_{4BP}$ are less than $L_{SD}$, a collision has occurred, and is reported in process 2014. If not, no collision has occurred between these two volumes, as reported by message 2015. Test 2008 then results in the message "No collision detected" 2009 being reported.

Figure 22A:
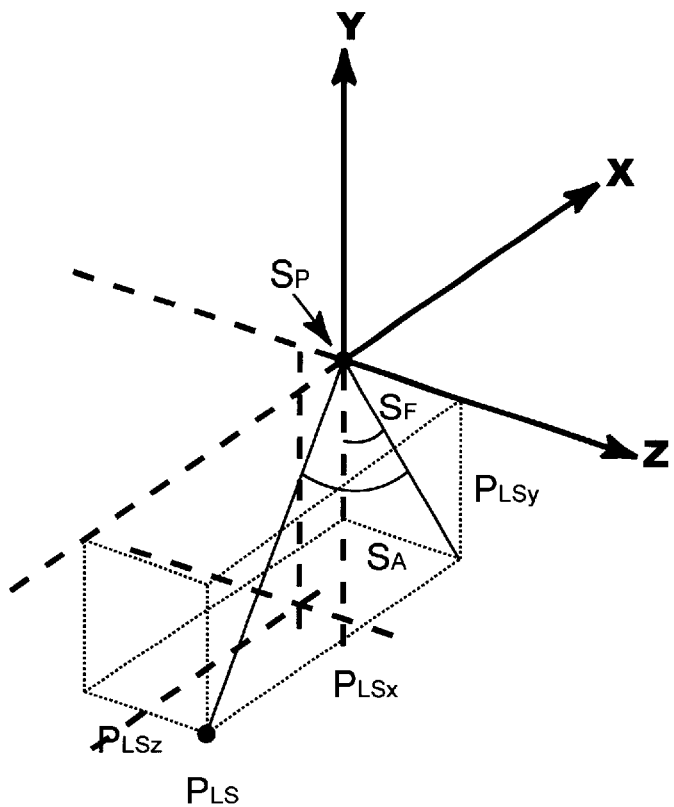
FIGS. 22a, 22b, and 22c illustrate the processes for computing the arm joint rotations.

Referring back to FIG. 19, the joint angles are now computed, as shown in process blocks 1907 through 1911. First, in process 1907, the shoulder flexion $S_F$ and abduct $S_A$ are computed. FIG. 22a shows the angles $S_F$ and $S_A$. $S_F$ is the shoulder flexion required to place the elbow at the same z value as $P_{LS}$. $S_A$ is the shoulder abduction required to place the elbow at the same x and y values as $P_{LS}$, after applying $S_F$.

Figure 22B:
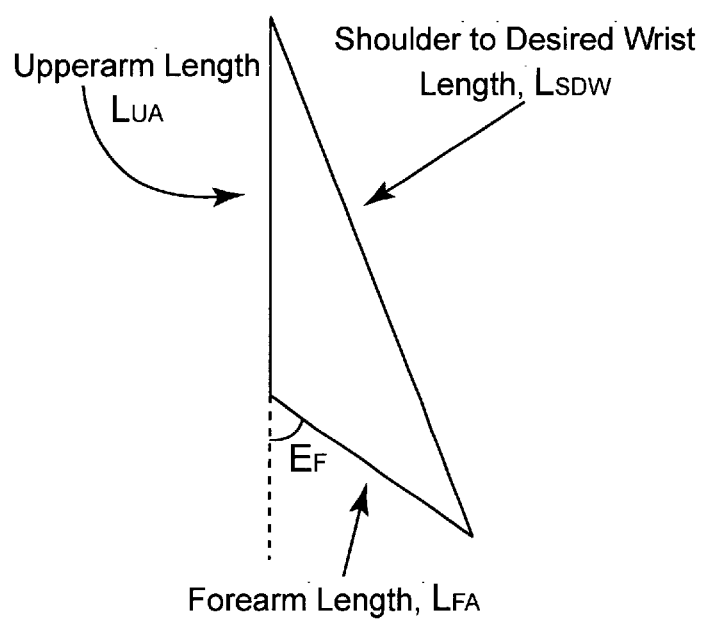

Next, the elbow flexion $E_F$ is computed in process 1908. FIG. 22b shows the angle $E_F$. $E_F$ is the flexion applied at the elbow bend to place the wrist in the desired wrist position, $P_{DW}$, after the shoulder twist, $S_T$.

$$E_F = \pi - \arccos\left(\frac{L_{UA}^2 + L_{FA}^2 - L_{SDW}^2}{2 * L_{UA} * L_{FA}}\right)$$

Figure 22C:
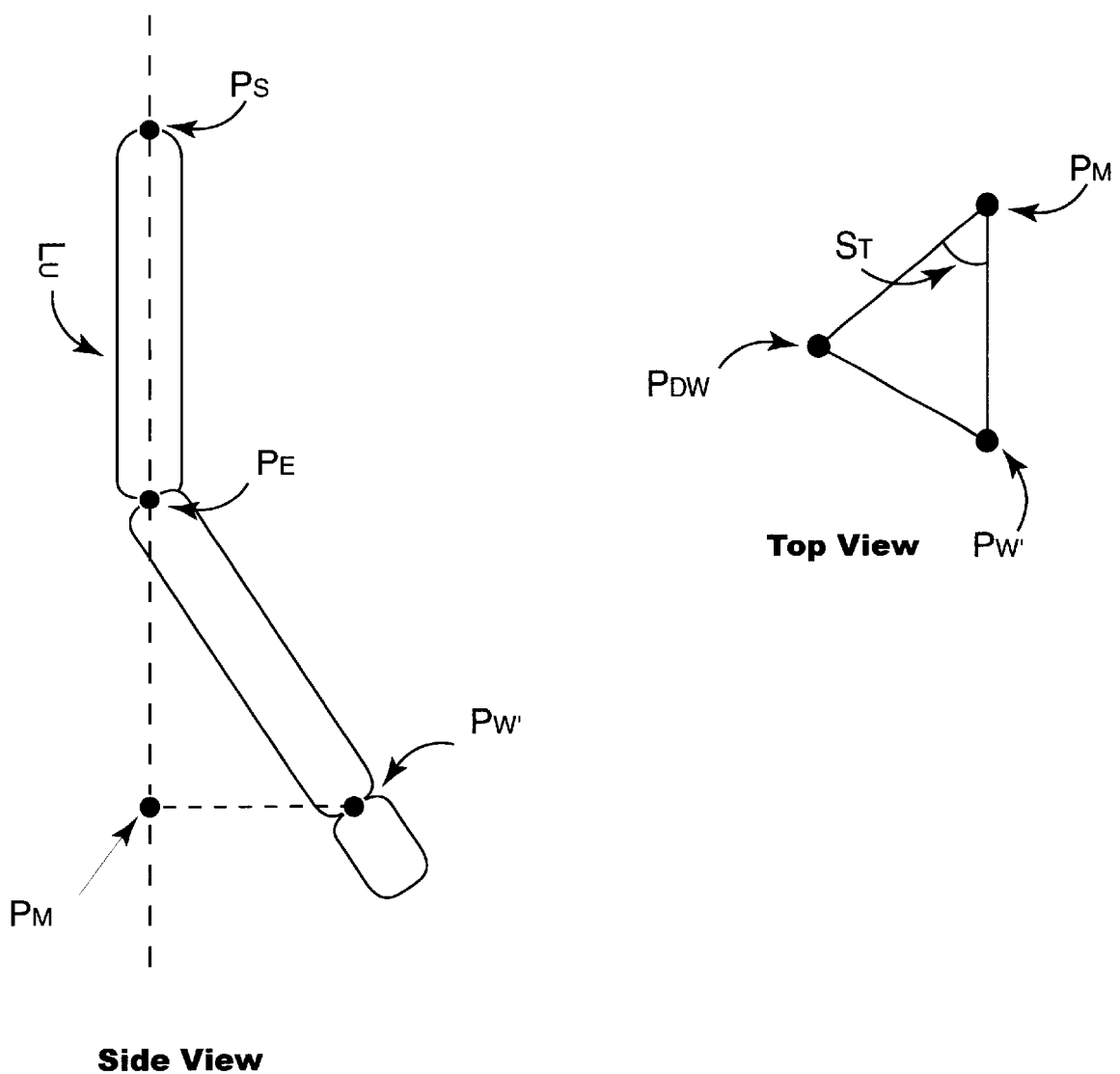

Next, the shoulder twisting angle $S_T$ is computed in process 1909. FIG. 22c shows the angle $S_T$. $S_T$ is the twist angle applied at the shoulder to place the wrist in the desired wrist position, $P_{DW}$. Line $L_U$ is defined by the line passing through $P_S$ and $P_E$. Point $P_W'$ is defined to be $P_W$ after $E_F$ has been applied. Point $P_M$ is defined by the closest point on line $L_U$ to $P_W'$.

$$P_W' = E_F * P_W$$

$$S_T = \arccos\left(\frac{(P_M - P_W)^2 + (P_M - P_{DW})^2 - (P_{DW} - P_W)^2}{2 * (P_M - P_W) * (P_M - P_{DW})}\right)$$

The full shoulder rotation, $S_R$, can be expressed as the product of the three shoulder angle components:

$$S_R = S_T * S_A * S_F$$

Next the wrist flexion, $W_F$, and wrist pivot, $W_P$ are calculated as shown in process 1910. To calculate $W_F$ and $W_P$, a reset rotation, $R_R$, is computed to reorient the wrist back to the global orientation. The orientation of the reset wrist, $W_R'$, is also computed.

$$R_R = S_R^{-1} * E_F^{-1}$$

$$W_R' = O_{DW} * R_R$$

The rotation $W_R'$ includes $W_F$, $W_P$, and $E_T$.

The elbow twisting, $E_T$, is now separated from $W_R'$ in process 1911. To separate $E_T$ from $W_R'$, a unit vector pointing in the x-axis, $V_U$, is rotated with $W_R'$ to produce $V_R$. The magnitude of $E_T$ is computed from $V_R$.

$$V_U = [1,0,0]$$

$$V_R = W_R' * V_U$$

$$E_T = \operatorname{atan}\left(\frac{V_{Rz}}{V_{Rx}}\right)$$

The full elbow rotation, $E_R$, is computed:

$$E_R = E_T * E_F$$

Since $W_R'$ includes $W_F$, $W_P$, and $E_T$, the inverse of $E_T$ is applied to $W_R'$ to obtain the full wrist rotation, $W_R$.

$$W_R = W_P * W_F = E_T^{-1} * W_R'$$

A test 1912, is optionally applied at this point to determine whether all computed rotations are within acceptable limits for their respective joints. If any rotation is outside of an acceptable range, then the point being processed is deleted from the list of points, as shown in process 1913. The sequence of processes beginning with process 1911 is then repeated for the next point in the list.

If no collision is detected, an IK command sequence is generated, as shown in process 1914. To build the IK command sequence, $S_R$ is used as an override joint rotation for the shoulder. $E_R$ is used as an override joint rotation for the elbow. $W_R$ is used as an override joint rotation for the wrist. The sequence is formed using the joint override command, as illustrated in table 701 in FIG. 7. This completes the Process IK command operation.

Referring once again back to FIG. 10a., details of the Track process of blocks 1016, 1036, and 1044 will now be described. FIG. 23 shows the process for tracking with the head joint 232. Point P in FIG. 23 is the location of the target set by process 928 in the local coordinate system of the head's parent segment, most commonly the neck. To compute these coordinates for a target in the global character coordinate system, the global position of the target must be transformed into the coordinate system of each joint down the hierarchy depicted in FIG. 2 to the head 233. The global point is first transformed about the position of the sacroiliac 202 by the inverse of its current rotation. It is then likewise rotated about joints 230 and 232. It is also possible to track a target that is within the character's hierarchy, instead of within the stationary environment, by first transforming that point up the hierarchy to the global. This creates the appearance that the character is looking at a moving point on their body. Most commonly, a character will be commanded to look at a hand that is gesturing or performing a task. To track the wrist 214, for example, the wrist's coordinates are transformed about the position of the elbow 212 by the elbow's rotation. Then, likewise they are rotated about joints 210 and 202.

After P is computed in the coordinate system of the head's parent segment, the azimuth a and elevation e necessary for the head to point at P are calculated.

$$a = \arctan\frac{P_x}{P_z}$$

$$e = \arctan\frac{P_y}{\sqrt{P_x^2 + P_z^2}}$$

In order to simulate realistic behaviors, all track joints are assigned a glance factor g which determines the maximum rotation towards the target the joint is to achieve. a' and e' are the new azimuth and new elevation adjusted by g.

$$a' = a * g$$

$$e' = e * g$$

Finally, a' and e' are restricted by limits appropriate to the corresponding joint, and the resulting rotation $\alpha$ is determined. FIG. 23 shows a diagram of the head and the computed rotation $\alpha$ from the head's default rotation facing forward to the target point P. $\alpha'$ is the target rotation after being adjusted by g=0.5. To simulate natural human tracking, both the head and the eyes track the object of attention. For the eyes, g=1 is used, as the eyes tend to track exactly on their target. To rotate the head over time toward $\alpha'$, the spherical linear interpolation between the current rotation of the head and $\alpha'$ is multiplied by a speed factor s. Time 0 in FIG. 23 shows the amount $\theta'$ that the head would rotate of the total rotation $\theta$ toward the target with speed factor s=0.33. Faster speeds are assigned to faster rotations, such as those of the eyes. At Time 1, this operation is carried out again, resulting in the values $\theta$ and $\theta'$ shown in FIG. 23. The head continues to rotate by a fraction s of its remaining rotation each time processes 1016, 1036, and 1044 of the Animation Engine Cycle FIG. 10a are executed to update tracking. Note that over time, the value of $\theta'$ gets smaller, resulting in the head rotation animation slowing as it approaches the target. To simulate human behavior, the eyes have a greater value for s so that they would reach the target sooner than the head. After a large number of cycles, the tracking error $\theta$ and rate of rotation $\theta'$ approach 0, and the final tracking orientation is attained.

Figure 24:
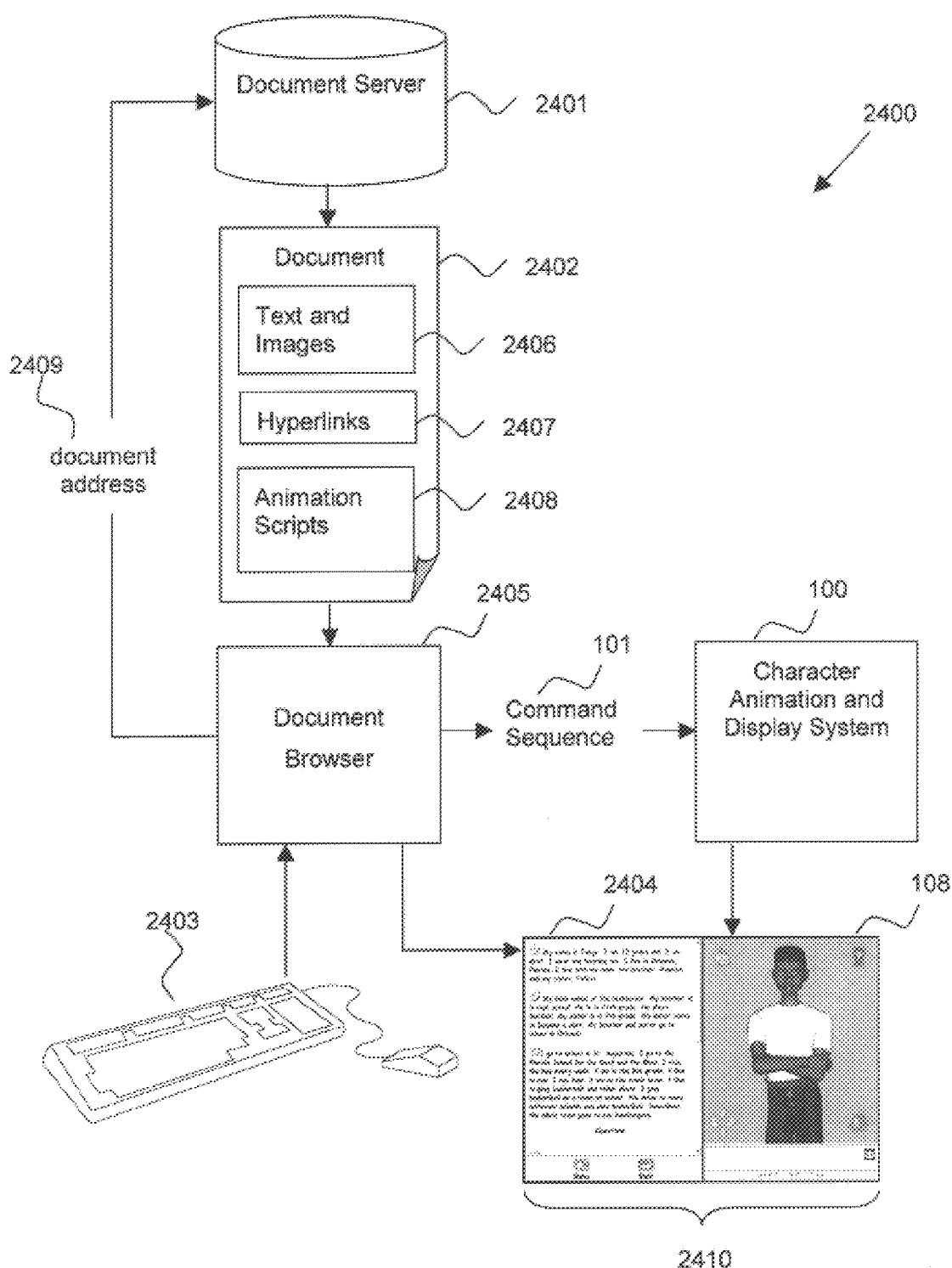
FIG. 24 is a diagram showing an Instructional System incorporating the Character Animation System.

Refering to FIG. 24, the Character Animation and Display System 100 may optionally be integrated into an Instructional System 2400 that includes a user input device 2403, a second display 2404, and a system 2401 for serving documents 2402 that are viewed in a document browser 2405. In the preferred embodiment, the input device 2403 includes a keyboard and a mouse. However, any other device, such as a stylus or trackball, that allows user selection of graphical and text items on a document page, may be used. Also, in the preferred embodiment, the document browser 2405 is of the type used to browse Internet Web pages authored in Hypertext Markup Language (HTML). However, other programs with similar browsing functionality may also be used. The Document Server 2401 may be an Internet Sever of the type using Hypertext Transfer Protocol (HTTP) or any other storage system that allow documents to be retrieved either locally or remotely using a document addressing system. The second display 2404 may be generated on a separte device from display 108, or it may generated using another portion of the display area of the same device, creating a combined display 2410.

The documents 2402 include text and images 2406, selectable Animation Scripts 2408, and optionally hyperlinks 2407 that include addresses 2409 to other documents stored in the server 2401. All of these types of content may be included in Internet Web pages using well-known features of Internet standards. The novelty of the present invention includes the association of Animation Scripts 2408 with text or images 2406 such that the character represented by the Character Animation System 100 and display 108 is caused to gesture in a manner representative of the associated text or image. Each Animation Script, when selected, causes an associated Command Sequence 101 to be sent to the Character Animation and Display System 100. By providing this association, the character is caused to demonstrate a gesture representative of the text or image. In one application of this invention, text or image representations of a concept, story, or other information are represented in sign language or gesture by the character when that text or image is selected by the user. In this manner, a user who is more proficient in sign language than in reading written text may be shown the sign language interpretation of the text. Similarly, a proficient reader may use the same system to learn sign language. The sign language may be American Sign Language or any of a number of sign languages practiced internationally.

The same Instructional System design 2400 may also be used to instruct any of a number of actions involving movement of the body or facial expression. These actions may include, for example, signals such as used for directing vehicle traffic, officiating sporting events, or leading members of a military contingent. The same system design may also be used to cause the character to point to items being described the text and other contents of the document. For example, in an instructional manual on the assembly of an engine or other apparatus, the Animation Scripts may be designed to cause the character to point to each component of the apparatus, as shown in an image in the document, when a text or image representation of that component is selected by the user.

Although the description above contains many specifics, these should not be construed as limiting the scope of the invention, but as merely providing illustrations of some of the presently preferred embodiments of this invention. For example, the simulated character need not be human, nor even human-like, but could be an animal or fictious creature. Also, the body need not be represented by rigid body segments, but may use surface deformations to provide seamless joints.

Thus the scope of the invention should be determined by the appended claims and their legal equivalents, rather than by the examples given.

We claim:

1. A method for animating a three-dimensional digital character, the method comprising:
    providing a digital representation of a character including joints and segments;
    providing a library of animations for the character, each animation defining a path of motion comprising predetermined joint positions and rotations for the character;
    providing a rendering system for displaying the character;
    receiving at least one command sequence representing a selected animation;
    determining an initial posture of the character;
    determining the posture of the character at the beginning of the selected animation;
    computing a first path of motion comprising joint rotations necessary to move the character from the initial posture to the posture at the beginning of the selected animation;
    obtaining a second path of motion from the library corresponding to the selected animation; and
    executing the first and second paths of motion in the rendering system to move the character from the initial posture to a final posture.

2. The method of claim 1, wherein the first path of motion is computed as a spherical linear interpolation from the initial posture to the posture at the beginning of the selected animation.

3. The method of claim 1, further comprising holding the initial posture for a hold time responsive to the command sequence.

4. The method of claim 1, further comprising executing the first path of motion at a rate responsive to the command sequence.

5. The method of claim 1, further comprising executing the second path of motion at a rate responsive to the command sequence.

6. The method of claim 1, further comprising receiving a command sequence representing at least two selected animations to be executed in sequence, and further comprising computing a path of motion for movement of the character between a last posture of a first selected animation and a first posture of a second selected animation for each consecutive selected animation.

7. The method of claim 6, further comprising;
    preparing a listing of first and second animation pairs wherein an interpolation between a last posture of the first animation and a first posture of the second animation would cause a collision between two segments of the character;
    defining an intermediate posture associated with each of the first and second animation pairs for avoiding the collision;
    determining if the first selected animation and second selected animated are included in the listing as a first and second animation pair, and if so, computing a path of motion for moving the character from the last posture of the first selected animation to the intermediate posture, and from the intermediate posture to the first posture of the second selected animation.

8. The method of claim 1, further comprising;

storing a plurality of fidget command sequences corresponding to a respective plurality of natural body fidgets;

detecting that no path of motion is currently being executed;

selecting one of the fidget command sequences; and executing the selected fidget command sequence as the selected animation.

9. The method of claim 1, further comprising synchronizing a facial expression animation for the character with the step of executing the first and second paths of motion.

10. The method of claim 9, further comprising:

providing a library of facial expressions for the character, the facial expression being defined by a plurality of vertices connected by a mesh, each vertex having a defined position in space for a facial expression;

receiving a sequence of facial expression commands associated with the selected animation, the sequence of facial expression commands having an initial expression and a final expression;

executing a transition sequence to move the plurality of vertices to the initial expression during the step of executing the first path of motion;

executing the sequence of facial expression commands associated with the selected animation during the step of executing the second path of motion.

11. The method of claim 10, further comprising looping the sequence of facial expression commands associated with the selected animation during the step of executing the second path of motion when the number of frames of the sequence of facial expression commands is less than the number of frames of the second path of motion.

12. In a character animation system wherein a digital representation of a character is displayed and animated on a rendering system, the character having a limb connected to a torso and including a spherical proximal joint interconnecting a proximal limb segment and the torso, a revolute central joint interconnecting the proximal limb segment and a distal limb segment, a spherical distal joint interconnecting the distal limb segment and an end effector, a method for determining preferred rotations of the spherical proximal joint, the revolute central joint and the spherical distal joint for placing the end effector in a desired position and orientation, the method comprising:

positioning the end effector in a desired position and orientation;

computing a center point, radius and central axis of a circle defining all possible positions of the revolute central joint given the positions and orientations of the end effector and the spherical proximal joint;

computing a level of stress for at least one of the spherical proximal joint, the revolute central joint and the spherical distal joint resulting from the placement of the revolute central joint at each of a plurality of candidate points on the circle; and computing the preferred rotations of the spherical proximal joint, the revolute central joint and the spherical distal joint as being the rotations necessary to position the revolute central joint at the one of the plurality of candidate points on the circle wherein the level of stress is a selected value.

13. The method of claim 12, wherein the level of stress is computed for the spherical distal joint.

14. The method of claim 12, further comprising:

testing for an intersection of the torso and the limb resulting from the placement of the revolute central joint at each of the plurality of candidate points; and eliminating any candidate point resulting in an intersection of the torso and limb.

15. The method of claim 14, further comprising testing for an intersection of the torso and the limb by modeling both the torso and a portion of the limb as respective cylinders with hemispherical caps and testing for collision between the two capped cylinder shapes.

16. The method of claim 14, further comprising determining if the computed preferred rotations are within predetermined limits for the respective joints.

17. In a character animation system wherein a digital representation of a character in an environment is displayed and animated on a rendering system, a method of tracking a point in the environment with a feature of the character, the method comprising:

orienting a feature of the character toward a defined point in the environment;

reorienting the feature of the character toward the defined point in response to a movement of the defined point within the environment relative to the feature of the character;

wherein the step of reorienting comprises moving the feature toward a reoriented position; and decelerating a rate of movement of the feature as it approaches the reoriented position.

18. The method of claim 17, further comprising:

computing a joint rotation necessary to move the feature to the reoriented position;

rotating a joint by a fixed percentage of the computed joint rotation during a first time interval;

repeating the steps of computing a joint rotation and rotating the joint by a fixed percentage of the computed joint rotation to move the feature toward the reoriented position at a decelerating rate of motion.

19. In a character animation system wherein a digital representation of a character in an environment is displayed and animated on a rendering system, the character having a head and an eye, a method of tracking a point in the environment with the head and eye of the character, the method comprising:

orienting the head and eye of the character toward a defined point in the environment;

reorienting the head and eye of the character toward the defined point in response to a movement of the defined point within the environment relative to the head and eye of the character;

wherein the step of reorienting comprises moving the head and eye toward a reoriented position; and decelerating a rate of movement of the head and eye as they approach the reoriented position.

20. The method of claim 19, wherein the rate of movement of the eye toward the reoriented position is accomplished at a faster rate than the movement of the head toward the reoriented position.

21. The method of claim 19, further comprising:

computing an offset rotation necessary to reorient the head and eye to the reoriented position;

for each of a plurality of successive time periods, moving the head and eye a fixed fraction of the computed offset rotation.

22. The method of claim 21, wherein the fixed fraction utilized for the eye is a greater value than the fixed fraction used for the head to simulate the natural effect of eye motion leading head motion when the character's gaze is directed toward the point in the environment.

23. A method of presenting information comprising:

providing a document including text and associated animation scripts;

displaying the document on a display device;

selecting a portion of the document with a user input device;

displaying an animation on the display device in response to an animation script associated with the selected portion of the document.

24. The method of claim 23, further comprising displaying a sign language interpretation of the selected portion of the document.

25. The method of claim 23, further comprising:

storing the document on a document server using a unique document address; and selecting the portion of the document using a document browser.

* * * * *